United States Patent
Itano et al.

(10) Patent No.: US 7,398,793 B2
(45) Date of Patent: Jul. 15, 2008

(54) RAPIDLY OPENING PRESSURE REGULATING VALVE, FIRE EXTINGUISHING APPARATUS USING THE SAME, HIGH-PRESSURE GAS CYLINDER APPARATUS AND APPARATUS FOR RAPIDLY SUPPLYING FLUID

(75) Inventors: Naoki Itano, Kobe (JP); Hideaki Goto, Kobe (JP); Koichiro Mizoguchi, Kobe (JP)

(73) Assignee: Air Water Safety Service, Inc., Kobe-shi Hyogo (JP)

( * ) Notice: Subject to any disclaimer, the term of this patent is extended or adjusted under 35 U.S.C. 154(b) by 159 days.

(21) Appl. No.: 10/541,777

(22) PCT Filed: Jan. 9, 2004

(86) PCT No.: PCT/JP2004/000114
§ 371 (c)(1),
(2), (4) Date: Jul. 8, 2005

(87) PCT Pub. No.: WO2004/062733
PCT Pub. Date: Jul. 29, 2004

(65) Prior Publication Data
US 2006/0180207 A1 Aug. 17, 2006

(30) Foreign Application Priority Data
Jan. 10, 2003 (JP) ............................ P2003-005002

(51) Int. Cl.
*G05D 16/04* (2006.01)
(52) U.S. Cl. ............ 137/68.3; 137/505.11; 137/505.13; 137/505.28; 137/505.41; 169/19
(58) Field of Classification Search .............. 137/68.3 I, 137/505.13, 505.15, 495 X, 505.28, 505.41, 137/68.3, 315.04, 495, 505.11, 505.25, 505.39; 169/19 X, 20, 19; 251/144
See application file for complete search history.

(56) References Cited

U.S. PATENT DOCUMENTS
2,027,762 A * 1/1936 Becker ........................ 137/498
(Continued)

FOREIGN PATENT DOCUMENTS
JP 55-20103 B2 5/1980
(Continued)

OTHER PUBLICATIONS
International Search Report and International Preliminary Examination Report, Dec. 2004.
(Continued)

*Primary Examiner*—Stephen M Hepperle
(74) *Attorney, Agent, or Firm*—Harness, Dickey & Pierce, P.L.C.

(57) ABSTRACT

A rapid opening pressure regulating valve reduced in size and having improved flow rate characteristics, a fire extinguishing apparatus using the same, a high-pressure gas cylinder apparatus, and an apparatus rapidly supplying a fluid. When the rapid opening pressure regulating valve is assembled, a valve element member body (22) is inserted into a body (1), and a valve element (21) is inserted into an inlet nozzle part (11) from the inlet (11*a*) thereof and fixed to the lower end of the valve element member body (22). The valve element (21) is fixed to the valve element member body (22) by, for example, threading the inner circumferential surface of the valve element (21) and the corresponding lower end outer peripheral surface of the valve element member body (22) and screwing the lower end of the valve element body (22) into the valve element (21). Since a valve seat (13) can be provided on the valve element (1), the valve element member body (22) can be inserted from the upper end of the body (1) and the valve element (21) can be inserted from the inlet (11*a*) of the body (1), and the valve element member body (22) and the valve element (21) can be installed so as to hold the valve seat (13), a conventional barrel part can be eliminated and the number of members can be reduced to reduce the size of the rapid opening pressure regulating valve.

19 Claims, 15 Drawing Sheets

U.S. PATENT DOCUMENTS

| | | | | |
|---|---|---|---|---|
| 2,751,023 | A | * | 6/1956 | Conrad ............... 166/320 |
| 3,211,175 | A | * | 10/1965 | Replogle ............ 137/505.11 |
| 3,547,427 | A | * | 12/1970 | Kelly et al. ......... 137/505.41 |
| 4,844,111 | A | * | 7/1989 | Pritchard et al. .... 137/505.25 |
| 5,732,736 | A | * | 3/1998 | Ollivier ............... 137/505.41 |
| 6,615,865 | B1 | * | 9/2003 | Eusebi ............... 137/505.25 |

FOREIGN PATENT DOCUMENTS

| | | |
|---|---|---|
| JP | 64-84857 A | 3/1989 |
| JP | 7-225000 A | 8/1995 |
| JP | 10-274397 A | 10/1998 |
| JP | 10-339383 A | 12/1998 |
| JP | 2000-74299 A | 3/2000 |
| JP | 3058841 B2 | 7/2000 |
| JP | 2000-309364 A | 11/2000 |
| JP | 2001-37904 A | 2/2001 |
| JP | 2002-750 A | 1/2002 |
| JP | 2002-257297 A | 9/2002 |

OTHER PUBLICATIONS

Japanese Office Action issued on Jan. 17, 2006, no translation.

* cited by examiner

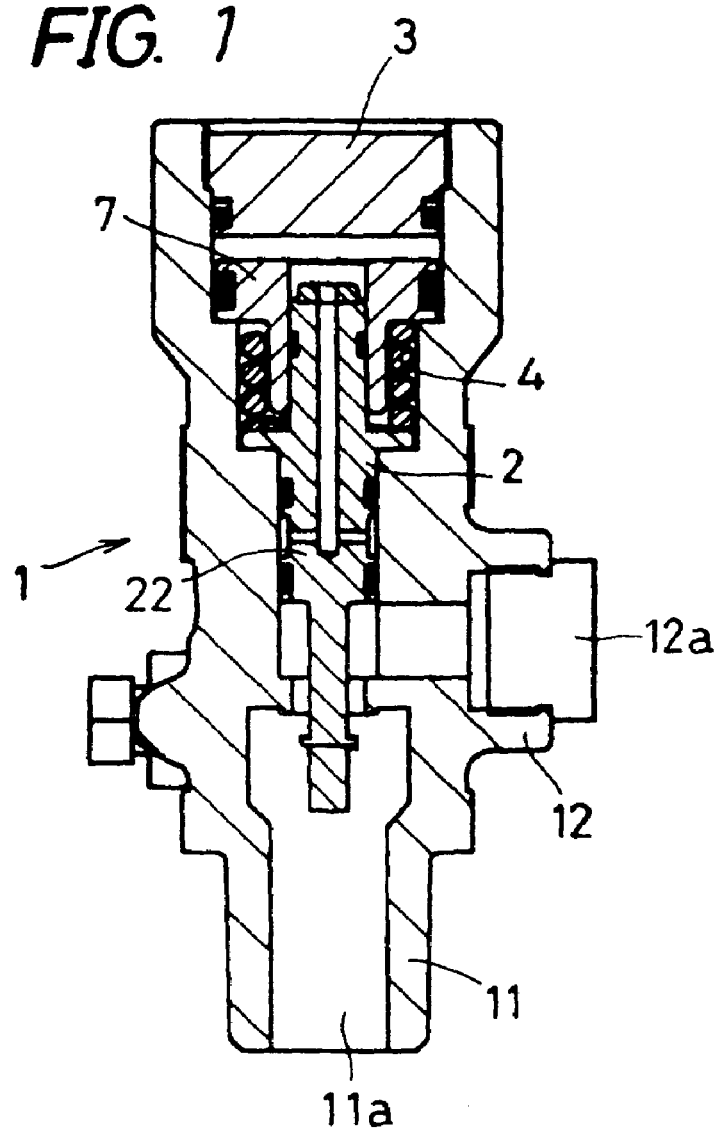

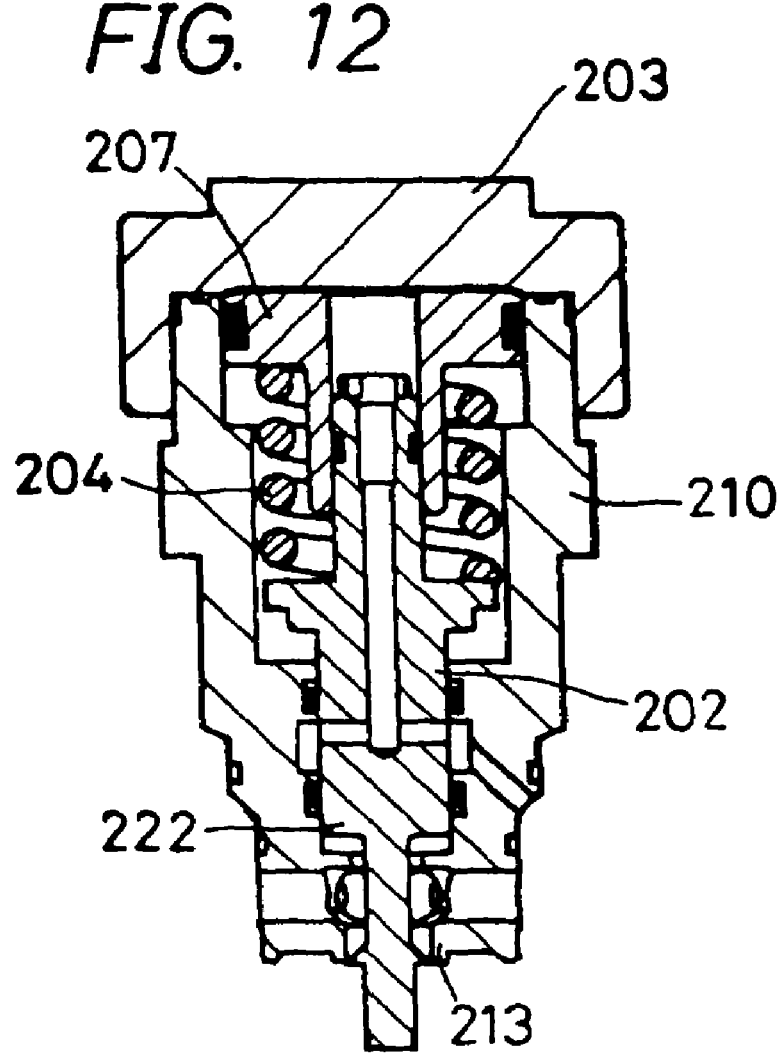
FIG. 12
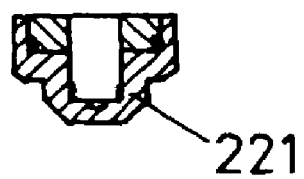

PRIOR ART
FIG. 13
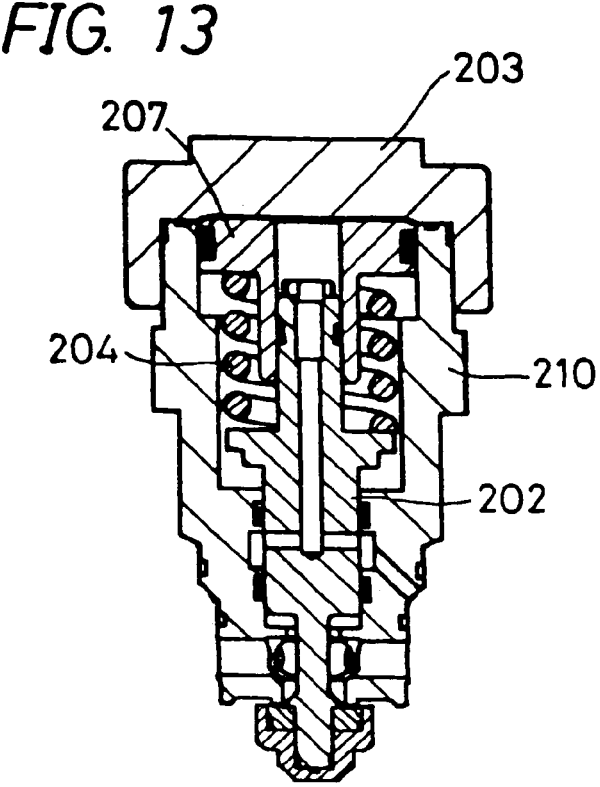
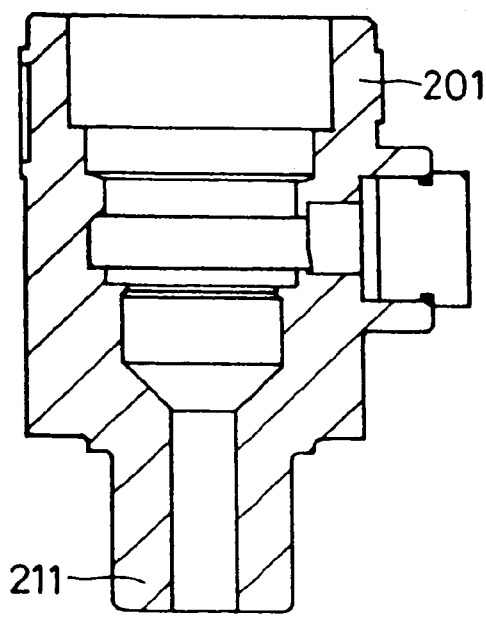

PRIOR ART

PRIOR ART

RAPIDLY OPENING PRESSURE REGULATING VALVE, FIRE EXTINGUISHING APPARATUS USING THE SAME, HIGH-PRESSURE GAS CYLINDER APPARATUS AND APPARATUS FOR RAPIDLY SUPPLYING FLUID

TECHNICAL FIELD

The present invention relates to a rapidly opening pressure regulating valve that is mounted, for example, in an inert gas cylinder for high pressure fire extinguishment that can be opened rapidly and whose maximum pressure on the secondary side has to be limited, a fire extinguishing apparatus using the same, a high pressure gas cylinder apparatus and an apparatus for rapidly supplying fluid.

BACKGROUND ART

For example, as a valve for a $CO_2$ cylinder used in a $CO_2$ fire extinguishing apparatus or the like, a valve that can be opened rapidly by introducing a high pressure gas for starting is generally used. However, with this type of valves, the pressure on the outlet side cannot be limited. On the other hand, as a valve including a mechanism for reducing pressure, a cylinder valve provided with various reducing valves that is opened and closed by rotating a handle has been proposed. However, such a valve cannot be opened rapidly.

On the other hand, the inventors of the present invention developed a rapidly opening pressure regulating valve as disclosed in Japanese Unexamined Patent Publication JP-A 10-339383(1998) (FIGS. 7 to 10). However, in such a rapidly opening pressure regulating valve, the main body of the valve includes a plurality of members so that it is difficult to reduce the size, and the flow rate characteristics are not good.

The main body of a rapidly opening pressure regulating valve has to include a plurality of members for the following reason. FIGS. 12 to 14 are views showing the order of assembling a conventional rapidly opening pressure regulating valve. First, a valve member 222 is inserted in a middle body 210 from the upper end, and a valve component 221 is attached to the lower end of the valve member 222 that is projected from the middle body 210. Furthermore, a moving spring receptacle 207 and a spring 204 are inserted in the middle body 210 and a spring receptacle 203 is fixed. Then, these elements are threaded into a main body 201 and fixed thereto.

In order for the valve component 221 to serve as an open valve, the valve component 221 has to be larger than a valve seat 213 of the middle body 210, and therefore it is necessary to separate the valve member 202 into the main valve member 222 and the valve component 221, and to assemble these elements with the valve seat 213 sandwiched therebetween. In this case, the middle body 210 having the valve seat 213 is necessary, in view of the relationship between the size of the valve component 221 and the inlet nozzle portion 211 of the main body 201.

FIG. 15 is a cross-sectional view taken along line B1-B2 of FIG. 14. When opening the valve, the valve member 202 slides in the direction perpendicular to the drawing sheet from the nearer side to the farther side. In this case, fluid flows the direction perpendicular to the drawing sheet from the farther side to the nearer side, is guided by a plurality of fluid guiding ports 212b and led to an outlet 212a via a fluid guiding groove 212c. When the middle body 210 is threaded into the main body 201 and fixed thereto, the fluid guiding port 212b is not always fixed in the same direction. The flow rate in the outlet 212a is different between the case when the positions of the fluid guiding port 212b and the outlet 212a are displaced significantly and the case when the positions thereof are matched, so that the flow rate is varied, which affects the flow rate characteristics.

DISCLOSURE OF INVENTION

An object of the invention is to solve the above-described problems in the conventional techniques and to provide a rapidly opening pressure regulating valve that is compact and has improved flow rate characteristics, a fire extinguishing apparatus using the same, a high pressure gas cylinder apparatus and an apparatus for rapidly supplying a fluid.

The invention is a rapidly opening pressure regulating valve comprising:

a main body provided with an inlet and an outlet of a fluid and a valve seat;

a valve member being composed of a main valve member having one end side and the other end side, and having a closing pressure-receiving surface that is in communication with the outlet, for receiving a pressure in a closing direction, and an opening pressure-receiving surface formed on the other end side, for receiving a pressure in an opening direction, which valve member is guided movably in an opening/closing direction by the main body, and a valve component that is mounted removably on the one end side through the inlet and opened and closed by being brought into contact with and being detached from the valve seat;

a channel for communicating the inlet with the other end side;

a biasing member for biasing the valve member in the opening direction;

a moving receiving portion that is interposed between a receiving member and the biasing member, the moving receiving portion being guided movably in the opening/closing direction, provided with a pressure-receiving surface for receiving a same pressure as the opening pressure-receiving surface, and generating a biasing force in the biasing means when moved to a predetermine position in the opening direction;

a positioning portion provided in the main body so as to stop the moving receiving portion at the predetermined position;

pressure-sealing means including a sealing plate that is provided so as to close the channel; and sealed pressure-releasing means provided in the main body, the sealed pressure-releasing means being constituted so as to supply a pressure in the channel to the opening pressure-receiving surface by breaking the sealing plate when operated, wherein a pressure-receiving area for receiving a fluid pressure of the valve component that is seated in the valve seat, a pressure-receiving area of the closing pressure-receiving surface, a pressure-receiving area of the opening pressure-receiving surface, and a biasing force of the biasing member are determined so as to have a relationship in which the channel is communicated and the opening pressure-receiving surface receives a pressure in the opening direction, whereby the valve component portion is opened and a valve closing force that closes the valve component portion when a pressure in the outlet exceeds a predetermined pressure becomes larger than the biasing force, whereby the valve component portion is closed.

The invention is a rapidly opening pressure regulating valve comprising:

a main body provided with an inlet and an outlet of a fluid and a valve seat;

a valve member being composed of a main valve member having one end side and the other end side, and having a closing pressure-receiving surface that is in communication with the outlet, for receiving a pressure in a closing direction, and an opening pressure-receiving surface formed on the other end side, for receiving a pressure in an opening direction, which valve member is guided movably in an opening/closing direction by the main body, and a valve component that is mounted removably on the one end side through the inlet and opened and closed by being brought into contact with and being detached from the valve seat;

a channel for communicating the inlet with the other end side;

a biasing member for biasing the valve member in the opening direction;

a moving receiving portion that is interposed between a receiving member and the biasing member, the moving receiving portion being guided movably in the opening/closing direction, provided with a pressure-receiving surface for receiving a same pressure as the opening pressure-receiving surface, and generating a biasing force in the biasing means when moved to a predetermine position in the opening direction;

a positioning portion provided in the main body so as to stop the moving receiving portion at the predetermined position;

pressure-sealing means including a pressure-sealing member that is provided so as to close the channel; and sealed pressure-releasing means provided in the main body, the sealed pressure-releasing means being constituted so as to supply a pressure in the channel to the opening pressure-receiving surface by keeping the pressure-sealing member open when operated, wherein a pressure-receiving area for receiving a fluid pressure of the valve component that is seated in the valve seat, a pressure-receiving area of the closing pressure-receiving surface, a pressure-receiving area of the opening pressure-receiving surface, and a biasing force of the biasing member are determined so as to have a relationship in which the channel is communicated and the opening pressure-receiving surface receives a pressure in the opening direction, whereby the valve component portion is opened and a valve closing force that closes the valve component portion when a pressure in the outlet exceeds a predetermined pressure becomes larger than the biasing force, whereby the valve component portion is closed.

The invention is characterized in that the pressure-sealing member is a sealing plate, the sealed pressure-releasing means comprising:

a needle portion provided so as to be opposed to the sealing plate;

a piston-like member for biasing the needle portion such that the needle portion penetrates the sealing plate by receiving a fluid pressure; and an operating portion formed so as to bias the piston-like member.

The invention is characterized in that the valve component comprises a contact portion that comes in contact with the valve seat; and a reinforcing portion for suppressing deformation of the contact portion, and the reinforcing portion is made of a material having a tensile strength of 200 N/mm$^2$ or more.

The invention is characterized in that an area of a region of the valve component that is opposed to the valve seat is the same as an area of the opening pressure-receiving surface.

The invention is characterized in that when the pressure-receiving area of the closing pressure-receiving surface is reduced, the pressure-receiving area for receiving a fluid pressure of the valve component seated in the valve seat and the pressure-receiving area of the opening pressure-receiving surface are constant, and the relationship is maintained.

The invention is characterized in that the receiving member is constituted such that its inner circumferential surface can guide movement of the moving receiving portion in the opening/closing direction.

The invention is characterized in that the receiving member and the main body are constituted so as to be capable of being thread-engaged with each other, and have contact portions other than engaged portions, which contact portions are formed to be tapered.

The invention is a rapidly opening pressure regulating valve comprising:

a valve member configured so as to be displaceable along an axis thereof; and a main body formed integrally with a cylinder insert portion that is inserted in a high pressure gas cylinder and in which an inlet of gas is formed, the rapidly opening pressure regulating valve comprising:

insert portion reinforcing means for increasing a mechanical strength of the cylinder insert portion.

The invention is characterized in that the cylinder insert portion includes a housed portion that is housed in a cylinder and an exposed portion that is exposed outside the cylinder, and the insert portion reinforcing means reinforces a portion including a vicinity of a boundary between the housed portion and the exposed portion.

The invention is characterized in that the insert portion reinforcing means comprises:

a reinforcing means main body portion provided across between both sides in the axis direction of the boundary;

a thread mechanism portion provided on one side in the axis direction of the boundary, for supplying a driving force to the reinforcing means main body portion toward the one side in the axis direction; and a thread-advance preventing portion provided on the other side in the axis direction of the boundary, for preventing the reinforcing means main body portion from advancing while being threaded to the one side in the axis direction.

The invention is characterized in that the reinforcing means main body portion is formed in a cylindrical shape, the thread-advance preventing portion is formed integrally with the reinforcing means main body portion and projects outward in a radial direction of the reinforcing means main body portion to be engaged with a cylinder insert portion, and the thread mechanism portion has an inner threaded portion that is formed integrally with the inner circumferential portion of the cylinder insert portion, and an outer threaded portion that is formed integrally with the outer circumferential portion of the reinforcing means main body portion and that is thread-engaged with the inner threaded portion.

The invention is a fire extinguishing apparatus comprising:

an inert gas cylinder for storing inert gas for fire extinguishment;

the rapidly opening pressure regulating valve mentioned above in which the inlet of the main body is mounted on the inert gas cylinder, wherein the fire extinguishing apparatus comprises a line for guiding the inert gas from an outlet of the rapidly opening pressure regulating valve to a fire extinguishment area.

The invention is a high pressure gas cylinder apparatus comprising:

a high pressure gas cylinder; and the rapidly opening pressure regulating valve mentioned above in which the inlet of the main body thereof is mounted on the high pressure gas cylinder.

The invention is an apparatus for rapidly supplying a fluid comprising:

a fluid source for supplying a fluid; and the rapidly opening pressure regulating valve mentioned above in which the inlet of the main body thereof is provided in the fluid source.

BRIEF DESCRIPTION OF THE DRAWINGS

Other and further objects, features, and advantages of the invention will be more explicit from the following detailed description taken with reference to the drawings wherein:

FIG. 1 is a view showing an order of assembling a rapidly opening pressure regulating valve to which the invention is applied;

FIG. 6 are explanation views of a sealing plate mechanism, of which

FIG. 7 show a relationship of pressures applied to different parts of a valve member 2, of which

FIG. 12 is a view showing an order of assembling a conventional rapidly opening pressure regulating valve;

FIG. 13 is a view showing an order of assembling a conventional rapidly opening pressure regulating valve;

DETAILED DESCRIPTION

Figure 2:
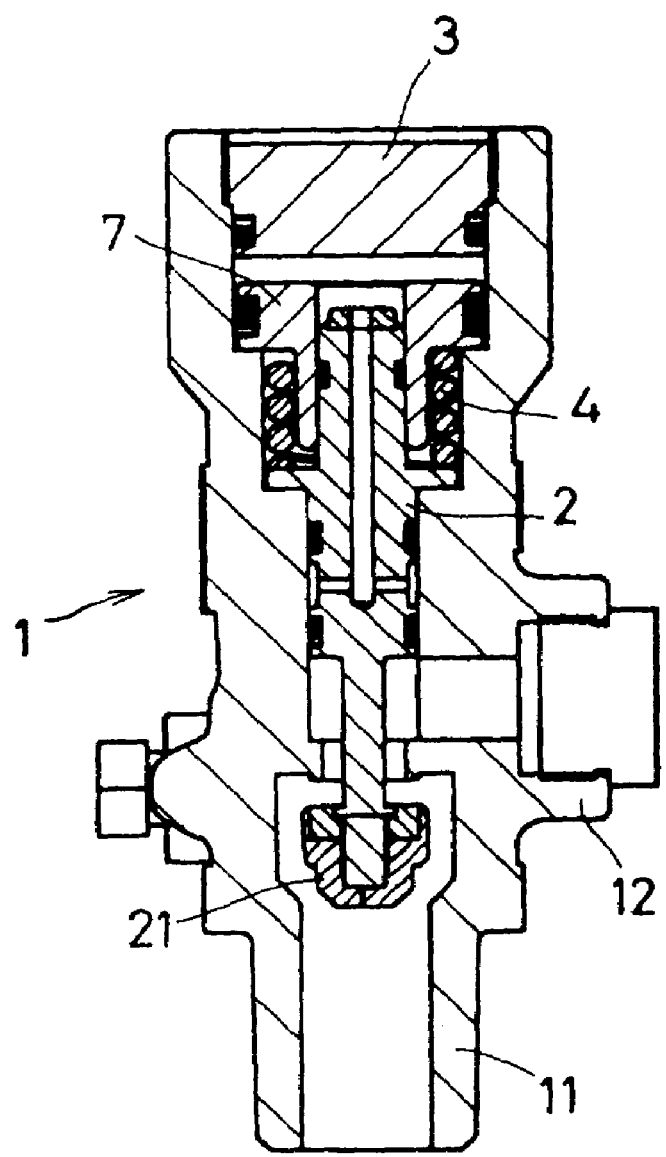
FIG. 2 is a view showing an order of assembling a rapidly opening pressure regulating valve to which the invention is applied.

Now referring to the drawings, preferred embodiments of the invention are described below.

Hereinafter, preferable embodiments of a rapidly opening pressure regulating valve of the invention, a fire extinguishing apparatus using the same, a high pressure gas cylinder apparatus and an apparatus for rapidly supplying a fluid will be described with reference to the accompanying drawings. FIGS. 1 and 2 are views showing an order of assembling a rapidly opening pressure regulating valve to which the invention is applied.

The rapidly opening pressure regulating valve of this embodiment includes a main body 1, a valve member 2, a spring receptacle 3, a spring 4, which is a bias member, and a moving spring receptacle 7, which is a moving receiving portion. The valve member 2 comprises a valve component 21 and a main valve member 22.

When assembling, first, as shown in FIG. 1, the main valve member 22, the spring 4, and the moving spring receptacle 7 are inserted in the main body 1, and the spring receptacle 3 is threaded in the upper end portion and fixed thereto. Next, the valve component 21 is inserted from an inlet 11a of an inlet nozzle portion 11 and attached to the lower end of the main valve member 22, as shown in FIG. 2. The valve component 21 and the main valve member 22 are fixed, for example, by threading the inner circumferential surface of the valve component 21 and the outer circumferential surface of the lower end of the main valve member 22 that corresponds thereto, so that the lower end of the main valve member 22 is threaded into the valve component 21 and fixed thereto.

The valve component 21 and the main valve member 22 may be fixed when the main valve member 22 is inserted into the main body 1, and then the spring 4 and the moving spring receptacle 7 may be inserted and the spring receptacle 3 may be fixed.

Figure 14:
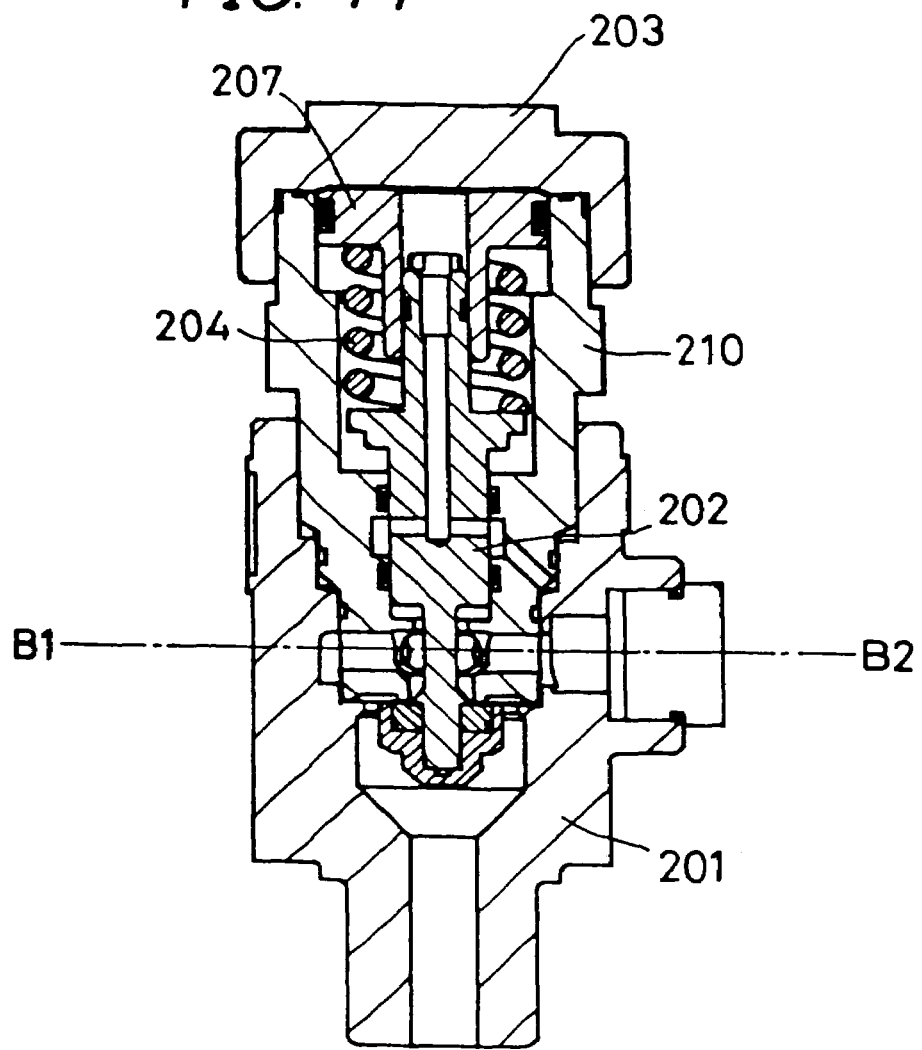
FIG. 14 is a view showing an order of assembling a conventional rapidly opening pressure regulating valve.
Figure 15:
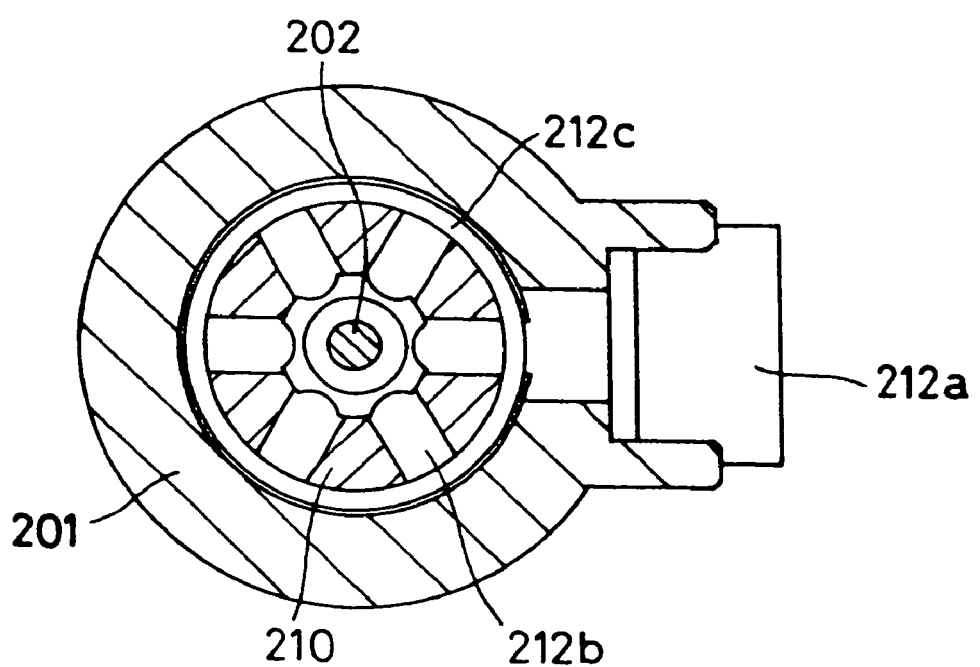
FIG. 15 is a cross-sectional view taken along line B1-B2 of FIG. 14.

As shown in FIGS. 12 to 14, in the conventional rapidly opening pressure regulating valve, the valve component 221 and the main valve member 222 are mounted in the middle body 210 and then the middle body 210 has to be fixed to the main body 201. On the other hand, in the rapidly opening pressure regulating valve in this example, the valve component 21 is inserted from the inlet 11a of the main body 1, so that the main body and the middle body are not separated but can be integral.

Figure 3:
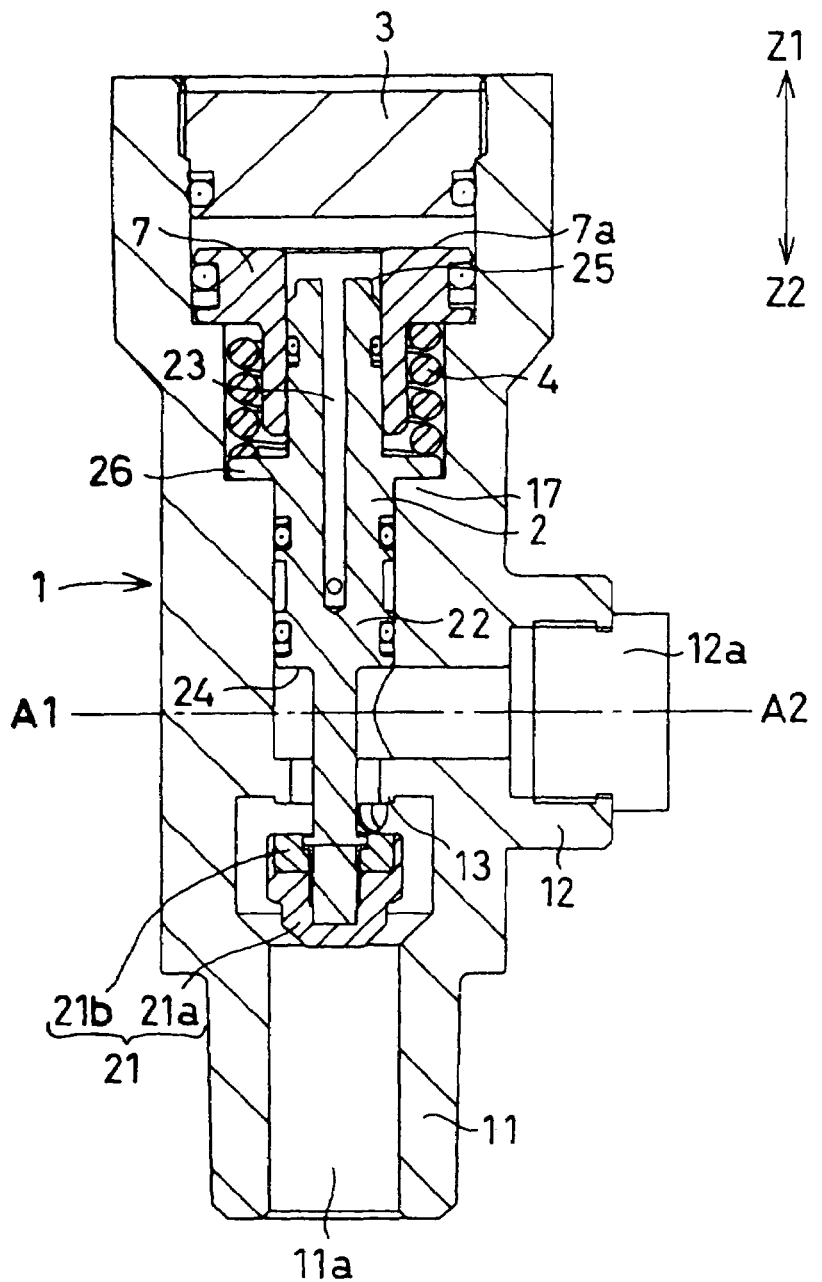
FIG. 3 is a cross-sectional view showing an entire configuration of a rapidly opening pressure regulating valve of an embodiment of the invention.
Figure 4:
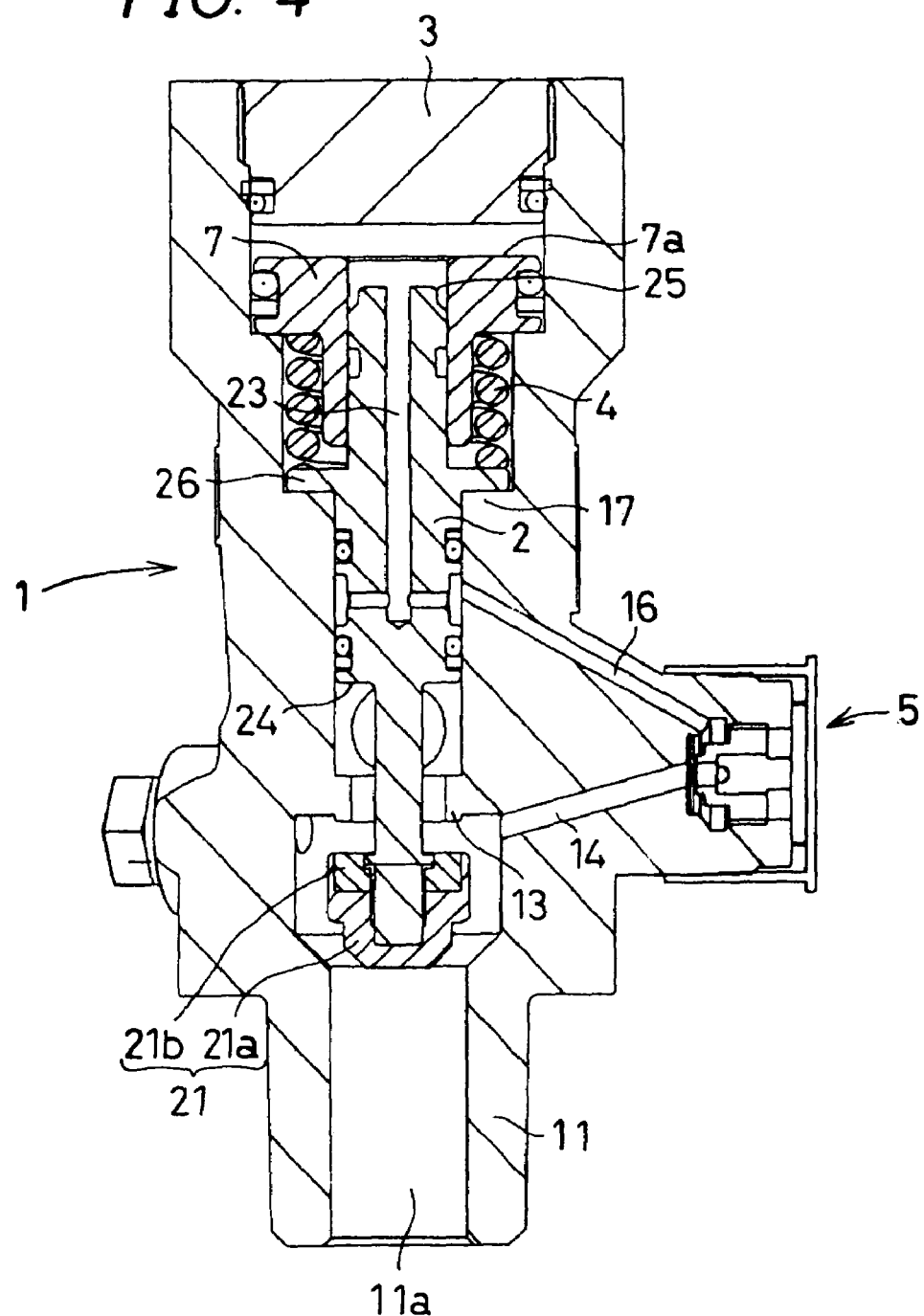
FIG. 4 is a cross-sectional view showing an entire configuration of an rapidly opening pressure regulating valve of an embodiment of the invention.

FIGS. 3 and 4 are cross-sectional views showing an entire configuration of a rapidly opening pressure regulating valve of this embodiment. The rapidly opening pressure regulating valve of this example includes a main body 1, a valve member 2, a lateral communication hole 14, which serves as a passage, a connection communication hole 16, a communication hole 23, a spring receptacle 3, a spring 4, a sealing plate mechanism 5, which is means for sealing pressure and is shown specifically in FIG. 6A, a valve-operating mechanism 6, which is means for releasing sealed pressure and is shown specifically in FIG. 6B, and a moving spring receptacle 7.

Figure 11:
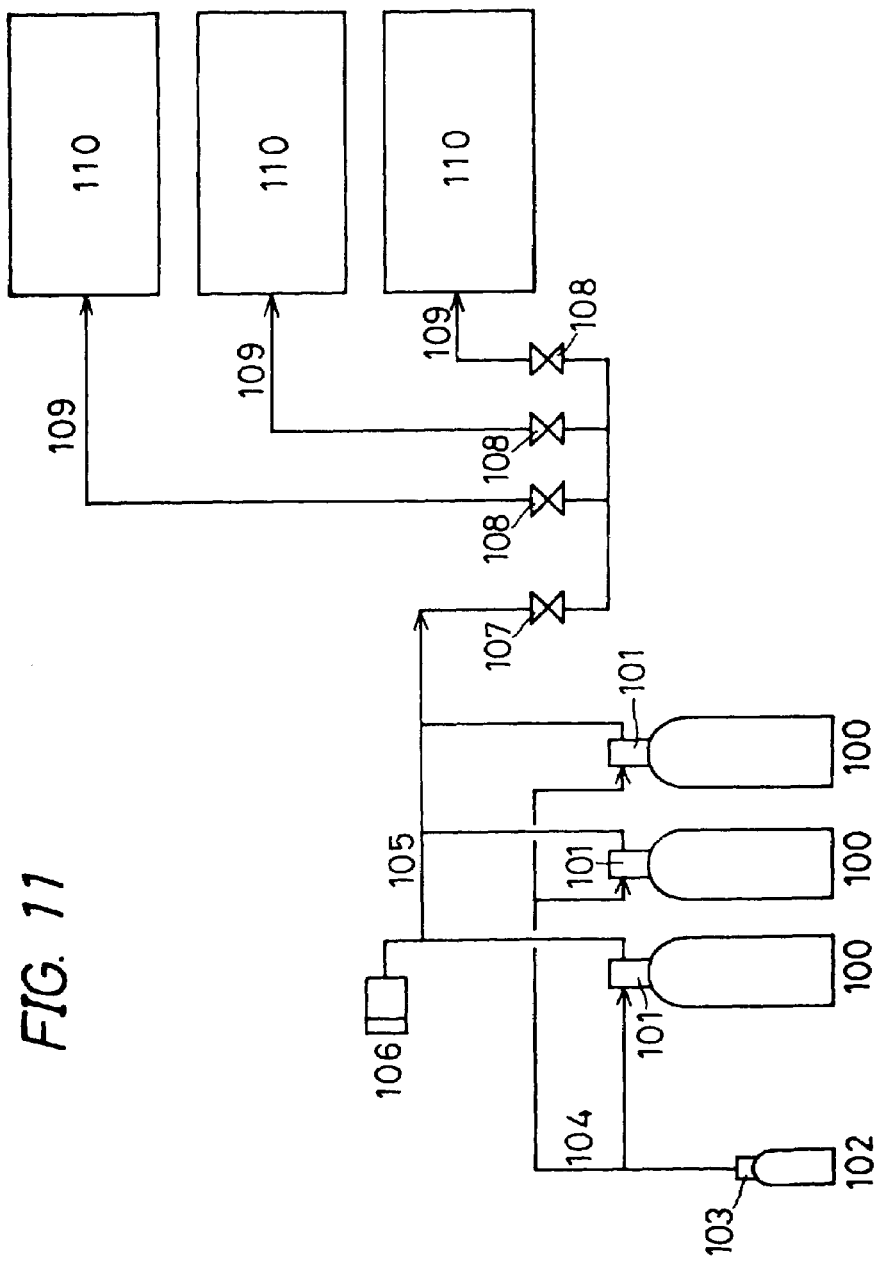
FIG. 11 is a diagram showing a system outline of a nitrogen fire extinguishing apparatus, which is one example of an apparatus to which rapidly opening pressure regulating valve is applied.

The main body 1 includes an inlet nozzle portion 11 and an outlet nozzle portion 12 that form an inlet 11a and an outlet 12a for, for example, high pressure nitrogen as a fluid, and a valve seat 13. The inner circumferential surface of the inlet nozzle portion 11 has a thread that is to be mounted in, for example, a high pressure nitrogen cylinder 100 when used as a rapidly opening pressure regulating valve 101 as shown in a schematic view of FIG. 11 described later. The outer circumferential surface of the outlet nozzle portion 12 has a thread on which, for example, a pipe of a nitrogen fire extinguishing line 105 as shown in the schematic view of FIG. 11 is mounted. The main body 1 may be provided with a pressure gauge, a safety valve seat (not shown) for a cylinder or the like as appropriate.

The valve member 2 is composed of a valve component 21 and a main valve member 22, and the valve component 21 is a valve portion that is opened and closed by being brought in contact with and detached from the valve seat 13. The valve component 21 includes a contact portion 21b that comes directly in contact with the valve seat 13 and a cap 21a that is a reinforcing portion for suppressing deformation of the contact portion 21b. The main valve member 22 includes a communication hole 23, a closing pressure-receiving surface 24, and an opening pressure-receiving surface 25. The valve member 2 is guided by the main body 1 in a movable manner in the direction shown by the horizontal arrow Z1-Z2 in the drawings, which is the valve opening and closing direction. The communication hole 23 is opened in the outer circumferential portion of substantially the central portion of the valve member 2 from the upper end side as one end side and the other end side in this example, and communicates from the opening of the outer circumferential portion to the inlet 11a through the connection communication hole 16, the sealing plate 52 and the lateral communication hole 14. The closing pressure-receiving surface 24 is in communication with the outlet 12a and receives pressure in the Z direction, which is the valve closing direction, when the valve is open. Therefore, An O ring for sealing pressure is provided in a guiding surface with which the valve member 2 is guided by the main body 1. The opening pressure-receiving surface 25 is formed in the end portion of the arrow Z1 direction and receives pressure in the Z2 direction, which is the valve opening direction, when the valve is open.

In order to allow the valve component 21 to be inserted from the inlet 11a of the main body 1 without changing the size of the valve seat 13, it is necessary to make the cap 21a small. The contact portion 21b is formed of, for example, Teflon™ and is pressed against the valve seat 13 by an inlet pressure when the valve is closed. The contact portion 21b may be deformed, depending on the size of the inlet pressure, and fluid may be leaked out to the outlet 12a. Therefore, the cap 21a reinforces the contact portion 21b by preventing the contact portion 21b from being deformed by covering all but a portion in which the contact portion 21b comes in contact with the valve seat 13. The contact portion 21b is deformed in the lateral direction when being brought in contact with the valve seat 13, and therefore, in order to suppress the deformation, it is necessary to cover the outer circumference of the contact portion 21b with a predetermined thickness. Herein, the predetermined thickness can be determined by the tensile strength, which is the characteristic value of the material of the cap 21a. As the tensile strength is larger, the thickness of the cap 21a can be smaller and thus the valve component 21 can be smaller. The wall thickness of the inlet nozzle portion 11 is determined by the inlet pressure, and the inner diameter of the inlet nozzle portion 11 is accordingly determined.

The tensile strength and the thickness of the cap 21a for covering the outer circumference of the contact portion 21b are examined based on the inner diameter of the inlet nozzle portion 11. Then, it has been found that when the material has a tensile strength of 200 N/mm$^2$ or more, the cap 21a has an adequate strength even if the thickness of the cap 21a for covering the outer circumference of the contact portion 21b is decreased to the size that allows the valve component 21 to be inserted from the inlet 11a, and the deformation of the contact portion 21b can be suppressed. Therefore, a material having a tensile strength of 200 N/mm$^2$ or more is used, and the thickness of the portion that covers the outer circumference of the contact portion 21b is a predetermined thickness, for example, 1.5 mm or less, so that the valve component 1 including the cap 21a can be sufficiently small. As the material of the cap 21a, for example, brass and SUS can be used so that the valve component 21 can be sufficiently smaller than the inner diameter of the inlet nozzle portion 11. Thus, it is possible to assemble in the above-described manner, and the main body and the middle body are not separated but can be integral.

The spring receptacle 3 is mounted in the main body 1 by being threaded into the inner side of the upper end portion of the main body 1 in this example, and the spring receptacle 3 supports the reaction of the spring 4 via the moving spring receptacle 7. More specifically, after the sealing plate 52 is opened as described later, the introduced pressure on the valve inlet side is received by a space portion between itself and the moving spring receptacle 7 to generate a pressure to the moving spring receptacle 7, so that the force of the spring 4 is supported via the moving spring receptacle 7. On the other hand, before the opening, the spring receptacle supports the upper end of the moving spring receptacle 7 so that the spring 4 is substantially completely stretched. In this case, a gap may be generated between the upper end of the moving spring receptacle 7 and the contact surface of the spring receptacle 3, or the upper end of the moving spring receptacle 7 and the contact surface of the spring receptacle 3 may come in contact with each other to the extent that some spring force remains.

The valve member 2 is sealed with an O ring at the necessary portion so as to be slidable in an airtight state. The spring 4 is mounted between the moving spring receptacle 7 and the spring receiving portion 26 of the valve member 2, and biases the valve member 2 to the Z2 direction.

The moving spring receptacle 7 is mounted between the spring receptacle 3 and the spring 4, is guided movably in the opening/closing direction Z1-Z2 by the main body 1, provided with a pressure-receiving surface 7a for receiving the same pressure as the opening pressure-receiving surface 25, stopped by a positioning portion 17 when being moved to the lower position, which is a predetermined position in the opening direction Z2, and lets the spring 4 generate a spring force F. That is to say, the moving spring receptacle 7 serves as a substantial spring receptacle anew inside the spring receptacle 3. The position of the positioning portion 17 may be adjustable by forming a thread in the positioning portion 17 or preparing a thin adjusting member that can be mounted thereon.

Figure 5:
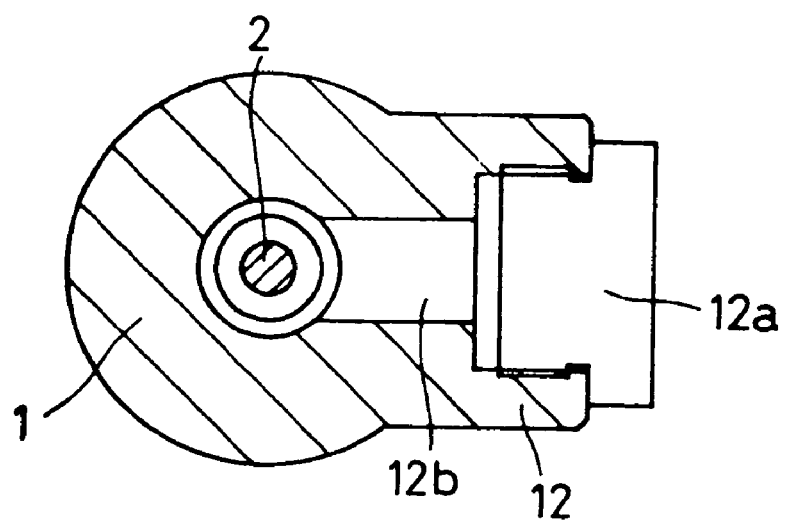
FIG. 5 is a cross-sectional view taken along A1-A2 of FIG. 3.

FIG. 5 is a cross-sectional view taken along A1-A2 of FIG. 3. At the time of opening the valve, the valve member 2 slides from the nearer side to the farther side in the direction perpendicular to the drawing sheet. At this time, the fluid advances from the farther side to the nearer side in the direction perpendicular to the drawing sheet, is guided to the outlet 12a by the fluid guiding port 12b, and is discharged from the outlet 12a to the outside of the valve. As shown in FIG. 12, in the conventional rapidly opening regulating valve, the middle body 210 is separate from the main body 201, so that a plurality of fluid guiding ports 212b are provided with the middle body 210, and fluid that is guided by each fluid guiding port 212b is guided to the outlet 212a via the fluid guiding groove 212c. In this case, the variation in the flow rate in the outlet 212a is large. On the other hand, in the rapidly opening regulating valve, the middle body and the main body are integrated into one piece, so that the fluid guiding port 12b is not displaced from the outlet 12a, and therefore there is no variation in the flow rate, which achieves good flow rate characteristics.

Figure 6A:
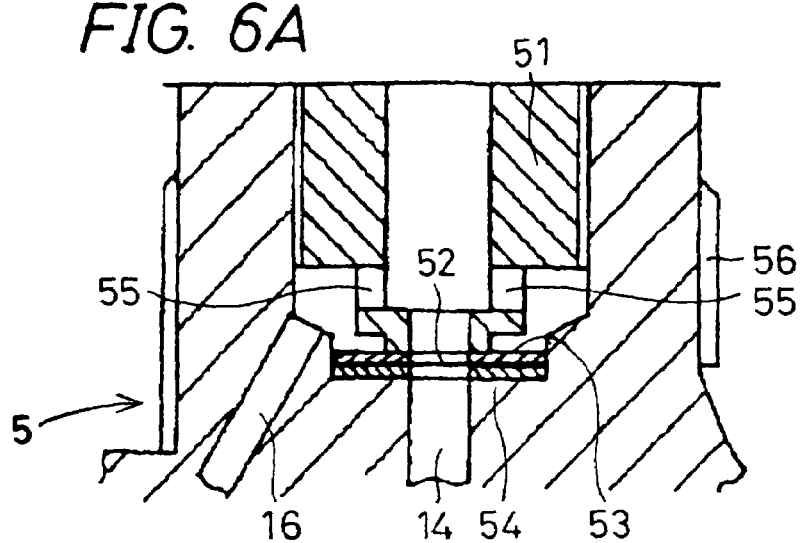
FIG. 6A is an enlarged sectional view of the sealing plate mechanism.

As shown in FIG. 6A, the pressure-sealing mechanism 5 includes a threaded ring 51, a sealing plate 52 made of, for example, a thin stainless steel for serving as a pressure-sealing member, and packing members 53, 54 that sandwich the sealing plate 52 by being pressed by the threaded ring 51. An air supply port 55 for fluid is provided in an end portion of the threaded ring 51. The sealing plate 52 blocks the communication between the inlet 11*a* and the communication hole 23 by blocking the communication between the lateral communication hole 14 and the connection communication hole 16.

A thread 56 is formed on the outer side of the nozzle portion constituting the pressure-sealing mechanism 5. Therefore, a thread 62*a* is formed on the inner side of an end portion of an inner tube 62 of the valve-operating mechanism 6, as shown in FIG. 6B, and is engaged with the thread 56 of the nozzle portion from the outside.

Figure 6B:
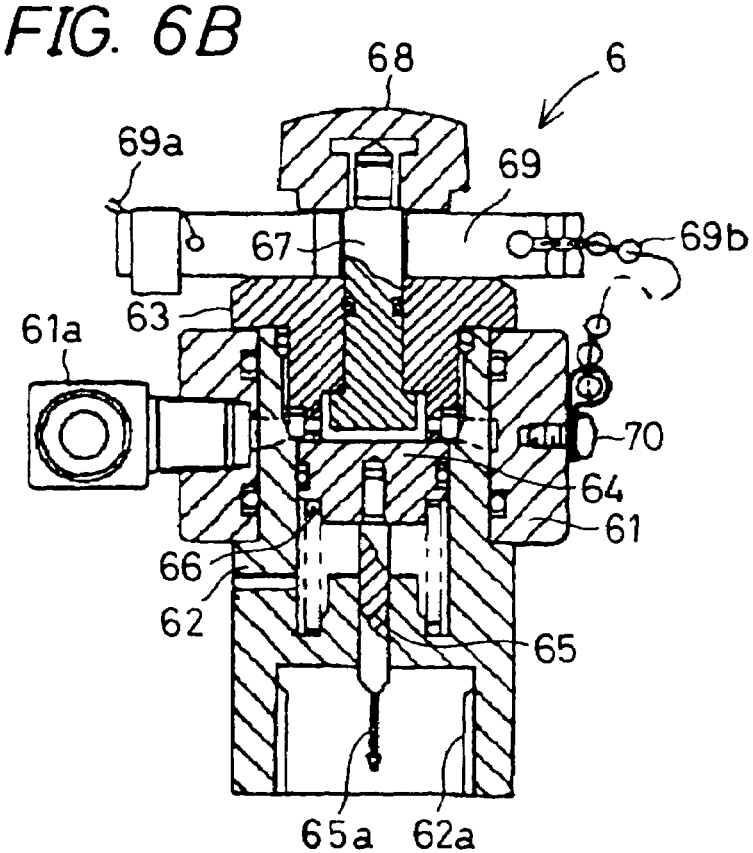
FIG. 6B is a longitudinal sectional view of a valve-operating mechanism 6 for this mechanism.

As shown in FIG. 6B, the valve-operating mechanism 6 includes an outer tube 61 to which an operation gas inlet 61*a* is mounted, an inner tube 62 inserted therein, a cover 63 that has an opening in its central portion and is threaded into and mounted in the inner tube 62 so as to close the upper end of the inner tube 62, an operation ring 64 that is inserted slidably in the inner tube 62 and whose upper position, which is the reaction direction, is regulated by the end portion of the cover 63, a needle member 65 mounted therein, a point 65*a*, which is a needle portion provided so as to be opposed to the sealing plate 52, a spring 66 for biasing the operation ring 64 upward, which is the reaction direction, a rod 67 provided with a ring that is inserted in the opening of the cover 63, a cap 68 for operating the same, a sandwiching plate 69 that is interposed between the cap and the cover 63 and holds the rod 67, a pin 69*a* that seals the sandwiching plate and a chain 69*b* that is engaged therewith, a screw 70 with which the chain is attached. An O ring for sealing is provided in a necessary position.

In such a structure, the operation ring 64 corresponds to a piston-like member that biases the point 65*a* via the needle member 65 so that the point 65*a* penetrates the sealing plate 52 by receiving pressure from a high pressure $CO_2$ starting gas line 104 as shown in FIG. 11 as a fluid pressure. The rod 67, the cap 68, the sandwiching plate 69 and the like constitute an operating portion formed so as to be capable of biasing the operation ring 64.

Figure 7A:
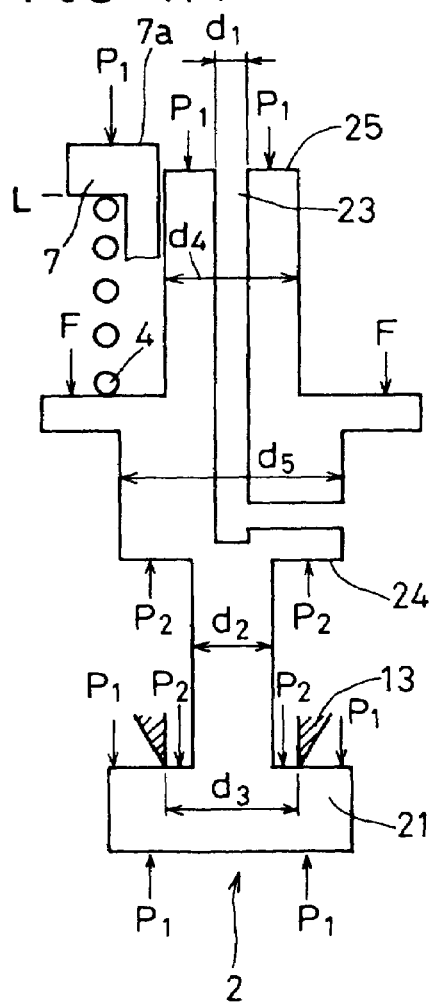
FIG. 7A shows a state after opening.
Figure 7B:
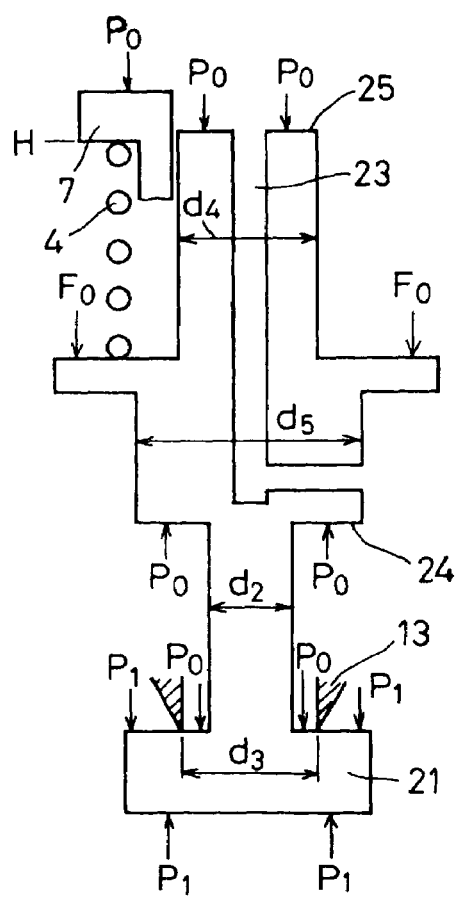
FIG. 7B shows a state before opening.

FIG. 7 shows a relationship of pressures applied to the valve member 2, and FIG. 7A shows a state after the sealing plate 52 is broken and opened, and FIG. 7B shows a state before the opening. When the sealing plate 52 is broken, in the rapidly opening pressure regulating valve of this example, gas in the inlet 11*a* flows sequentially through the lateral communication hole 14, the air supply port 55, the connection communication hole 16, the communication hole 23 to the opening pressure-receiving surface 25 and the pressure-receiving surface 7*a* of the moving spring receptacle 7, and a pressure $P_1$ is acted on these elements, as shown in FIG. 7A. Thus, on the side of the pressure-receiving surface 7*a*, the moving spring receptacle 7 is pressed down by the pressure $P_1$ in this portion and is lowered to a predetermined position L while compressing the spring 4, and then impinges on the positioning portion 17 of the main body 1 and stops. At this time, the spring 4 that is compressed by the moving spring receptacle 7 causes a spring force F to act on the valve member 2 in the opening direction.

As the sizes of the portions related to pressure adjusting function, the valve member 2 has a central diameter $d_3$ of the contact portion of the valve seat as the size of the valve seat 13, an outer diameter $d_5$ as the size of the closing pressure-receiving surface 24, and an outer diameter $d_4$ as the size of the opening pressure-receiving surface 25. These sizes of these portions and the spring force F as a biasing force are determined so as to have a relationship that allows the pressure $P_2$ of the outlet 12*a* to be no more than a predetermined pressure. It should be noted that $d_1$ and $d_2$ are the diameter of the communication hole 23 on which the inlet pressure acts and the minimum diameter of the shaft portion of the valve member 2 on which the outlet pressure acts, and both sizes are intermediately present.

In order to form a configuration having the above-described relationship, it is necessary to determine the sizes such that the valve is closed when $P_2$ becomes a predetermined pressure or more. Therefore, the condition scan be made into the following formula, taking the pressure in the inlet 11*a* as $P_1$.

$(\pi/4)[P_1 d_3^2 + P_2(d_5^2 - d_2^2)]$ (valve closing force)

$\geq (\pi/4)[P_1(d_4^2 - d_1^2) + P_2(d_3^2 - d_2^2)] + F$ (valve opening force)

Therefore, $$(\pi/4)[P_1(d_3^2 + d_1^2 - d_4^2) + P_2(d_5^2 - d_3^2)] \geq F \qquad (1)$$

The left side of this formula shows the total of valve closing force by the pressure, and the right side shows the valve opening force by the spring force. According to this formula, $P_1$ is constant, and F is a predetermined force at a predetermined stretch when the spring constant is fixed, so that, provided that $d_5$ is larger than $d_3$, when $P_2$ increases, the valve closing force increases. Therefore, when these sizes and F are determined so as to have the relationship as shown by the formula, when the outlet pressure $P_2$ exceeds a predetermined value, the valve closing force by pressure becomes larger than the spring force, so that the valve is closed. $P_2$ is not closer to $P_1$ any more, and therefore the outlet pressure $P_2$ can be limited to a desired predetermined pressure or less.

Herein, when the area $(\pi/4)(d_4^2 - d_1^2)$ of the opening pressure-receiving surface 25 is equal to the area $(\pi/4) d_3^2$ of the valve component 21 that comes in contact with the valve seat 13, the above formula becomes:

$$(\pi/4)[P_2(d_5^2 - d_3^2)] \geq F \qquad (2)$$

Thus, by determining only $d_5$, $d_3$ and F, the outlet pressure can be limited to a desired certain pressure or less. Thus, the valve can be designed easily. Furthermore, the outlet pressure can be limited, regardless of the inlet pressure, so that even if the inlet pressure is reduced and the outlet pressure is increased for some reason, the fluid can be prevented from flowing back to the inlet side. Furthermore, since the number of the portions related to pressure adjustment is reduced, the stability of operation is high, the outlet pressure can be limited reliably, and thus the reliability of the valve is improved.

In order to reduce the size of the rapidly opening pressure regulating valve without changing the inlet pressure and the outlet pressure, $d_5$ is reduced so that the diameter of the rapidly opening pressure regulating valve is reduced, and at the same time, the spring force F is reduced in accordance with the change of $d_5$ so that the pressure balance is not changed. When the diameter of the rapidly opening pressure regulating valve is reduced, the channel from the inlet 11*a* to the outlet 12*a* is narrowed, so that it is predicted that the flow rate characteristics are deteriorated. However, by reducing the spring force F, a response time that is a time until the spring force F acts on the valve member 2 at the time of opening the valve becomes short and the displacement amount by which the valve member 2 slides to the opening direction becomes large. Thus, the size of the rapidly opening pressure regulating valve can be reduced without deteriorating the flow rate characteristics.

When the sealing plate 52 is not open, the inlet pressure $P_1$ is not applied to the opening pressure-receiving portion 25 and the opening pressure-receiving portion 25 is in an atmospheric pressure, and therefore $d_4 = 0$ is achieved according to formula (1). Therefore, the valve closing force is sufficiently large and the valve maintains to be closed in a reliable manner. In this case, the outlet pressure is naturally an atmospheric pressure.

On the other hand, when the sealing plate 52 is broken in this state, since $P_2$ can be regarded as being substantially 0 in the formulae (1) and (2) if $P_1$ is sufficiently larger than the atmospheric pressure, almost only the spring force F acts as the valve opening/closing force, provided that the area $(\pi/4)(d_4^2 - d_1^2)$ of the opening pressure-receiving surface 25 is equal to or is not very different from the area $(\pi/4)d_3^2$ of the valve component 21 that comes in contact with the valve seat 13. Therefore, the valve is opened in a reliable manner. Then, the state in which the valve is open is maintained until the outlet pressure is increased to a predetermined pressure or more. In this case, when the force for opening the valve is even slightly larger, the valve is in full open, so that there is no possibility that the fluid resistance is increased by the opening/closing mechanism or the pressure adjusting mechanism.

Before the sealing plate 52 is opened, the pressure $P_1$ is high, and since the valve seat 13 comes in contact with the valve component 21 and the valve is closed, so that the pressure on the outlet 12a is atmospheric pressure $P_0$, which is low. As a result, as shown in formula (1), the valve closing force by the pressure $P_1$ is sufficiently larger than the valve opening force F by the spring, so that the valve can be closed. However, when $P_1$ becomes a predetermined pressure or less, the valve closing force becomes smaller than the valve opening force by the spring force F, and therefore the valve may be opened.

In the rapidly opening pressure regulating valve of this example, as shown in FIG. 7B, the pressure that acts on the pressure-receiving surface 7a of the moving spring receptacle 7 becomes atmospheric pressure $P_0$, so that the force for compressing the spring 4 is released, and the moving spring receptacle 7 is elevated from the position L at which the spring force F is generated to a position H at which the spring force becomes $F_0$, which is substantially zero. As a result, the force of the spring 4 substantially does not act on the spring receiving portion 26 of the valve member 2, so that the valve is maintained closed as long as the sealing plate is not broken. The arrows of $P_0$ and $F_0$ in the drawings show the pressure and the direction of the force, respectively, and the amplitude is substantially 0, as described above.

Figure 8:
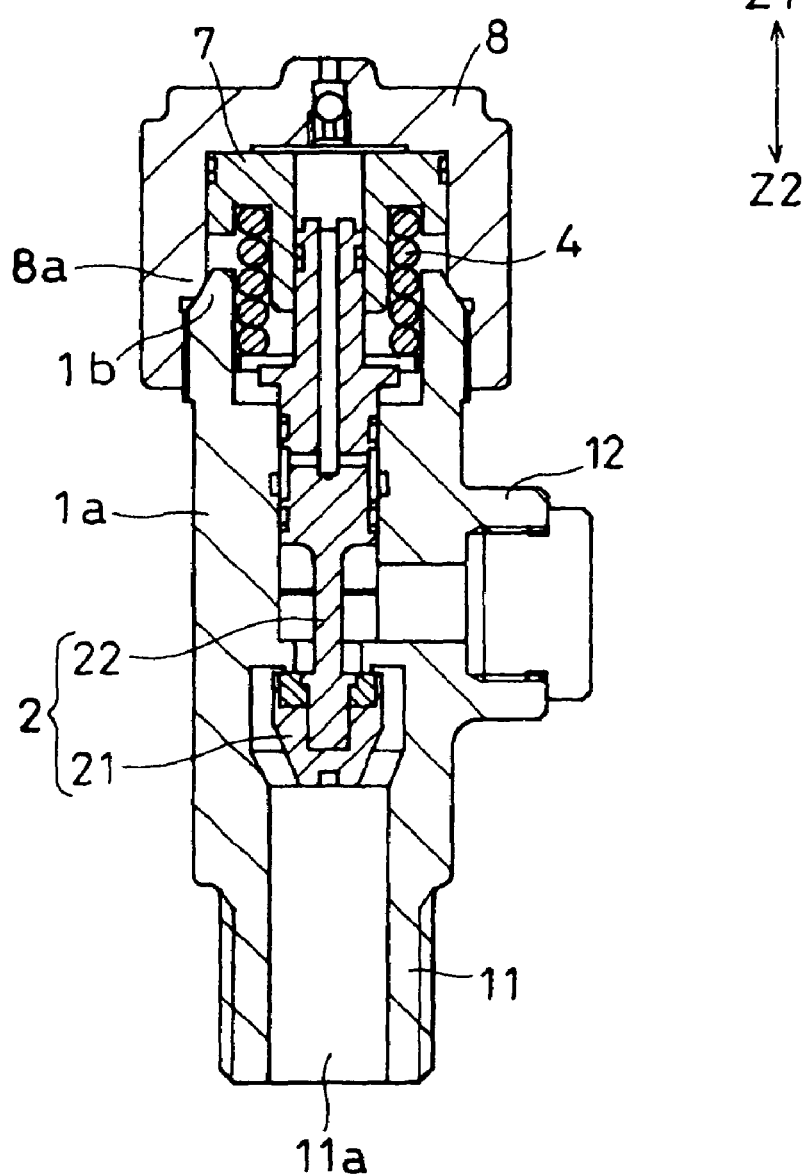
FIG. 8 is a cross-sectional view showing an entire configuration of a rapidly opening pressure regulating valve of another embodiment of the invention.

FIG. 8 is a cross-sectional view showing an entire configuration of a rapidly opening pressure regulating valve of another embodiment of the invention.

The rapidly opening pressure regulating valve of this example includes a main body 1a, a valve member 2, a spring receptacle 8, a spring 4, which is a bias member, and a moving spring receptacle 7, which is a moving receiving portion. The valve member 2 is composed of a valve component 21 and a main valve member 22. The rapidly opening pressure regulating valve of this example is different from the rapidly opening pressure regulating valve of the example shown in FIGS. 3 and 4 in the shapes of the main body and the spring receptacle, and the other portion than that are the same. The same portions as in the rapidly opening pressure regulating valve shown in FIGS. 3 and 4 bear the same reference numerals and are not described in detail. The relationship of the pressure applied to the valve member 2 as shown in FIG. 7 is the same as that in the rapidly opening pressure regulating valve shown in FIGS. 3 and 4.

In the above example, the inner circumferential surface of the upper end portion of the main body 1 and the outer circumferential surface of the spring receptacle 8 have corresponding threads, and the spring receptacle 8 is engaged with the upper end portion of the main body 1. In this example, the outer circumferential surface of the upper end portion of the main body 1a and the inner circumferential surface of the spring receptacle 8 that is formed so as to cover the upper end portion of the main body 1a have corresponding threads, and the upper end portion of the main body 1a is inserted in and engaged with the spring receptacle 8. In the above example, the moving spring receptacle 7 is guided movably in the opening/closing direction Z1-Z2 along the inner circumferential surface of the main body 1. In this example, the spring receptacle 8 guides the moving spring receptacle 7 movably in the opening/closing direction Z1-Z2 along the inner circumferential surface thereof. Therefore, the length of the main body 1a in the opening/closing direction can be smaller than the length of the main body 1 in the opening/closing direction at least by about the total of the thickness of the spring receptacle 8 in the opening/closing direction and the thickness of the movable area of the moving spring receptacle 7 in the opening/closing direction, more specifically, can be 10% to 30% smaller than the length of the main body 1 in the opening/closing direction. This reduces the weight of the main body 1a and facilitates processing.

The spring receptacle 8 and the main body 1a are provided with a contact portion 8a on the spring receptacle side and a contact portion 1b on the main body side that are positioned above from the engaged portion where the spring receptacle 8 and the main body 1a come in contact with each other when being engaged with each other. The contact portion 8a on the spring receptacle side and the contact portion 1b on the main body side are tapered with the central axis of the valve member 2 as the center, which makes it easy to align the axes when engaging the spring receptacle 8 and the main body 1a. The tapering angle of the contact portion 8a on the spring receptacle side and the contact portion 1b on the main body side is preferably $60°\pm20°$.

In order for the outer circumferential surface of the inlet nozzle portion 11 to be mounted in a high pressure nitrogen cylinder 100 when used as a rapidly opening pressure regulating valve 101 as shown in FIG. 11, the inlet nozzle portion 11 is tapered and threaded. When an excessive force is applied to the inlet nozzle portion 11 by the nitrogen cylinder 100 having tumbled down or having fallen down in the state where the rapidly opening pressure regulating valve 101 is mounted in the nitrogen cylinder 100, then stress concentration occurs, and thus the inlet nozzle portion 11 may be deformed.

On the other hand, this example includes insert portion reinforcing means that increases the mechanical strength of the inlet nozzle portion 11 to which the cylinder is to be inserted. In particular, as described above, the rapidly opening pressure regulating valve, in particular, the inlet nozzle portion 11 in the state where it is inserted in the cylinder can be prevented from being deformed by reinforcing a portion including a boundary portion between a housed portion that is housed inside the cylinder and an exposed portion that is exposed outside the cylinder, because stress concentrates on this portion.

Figure 9:
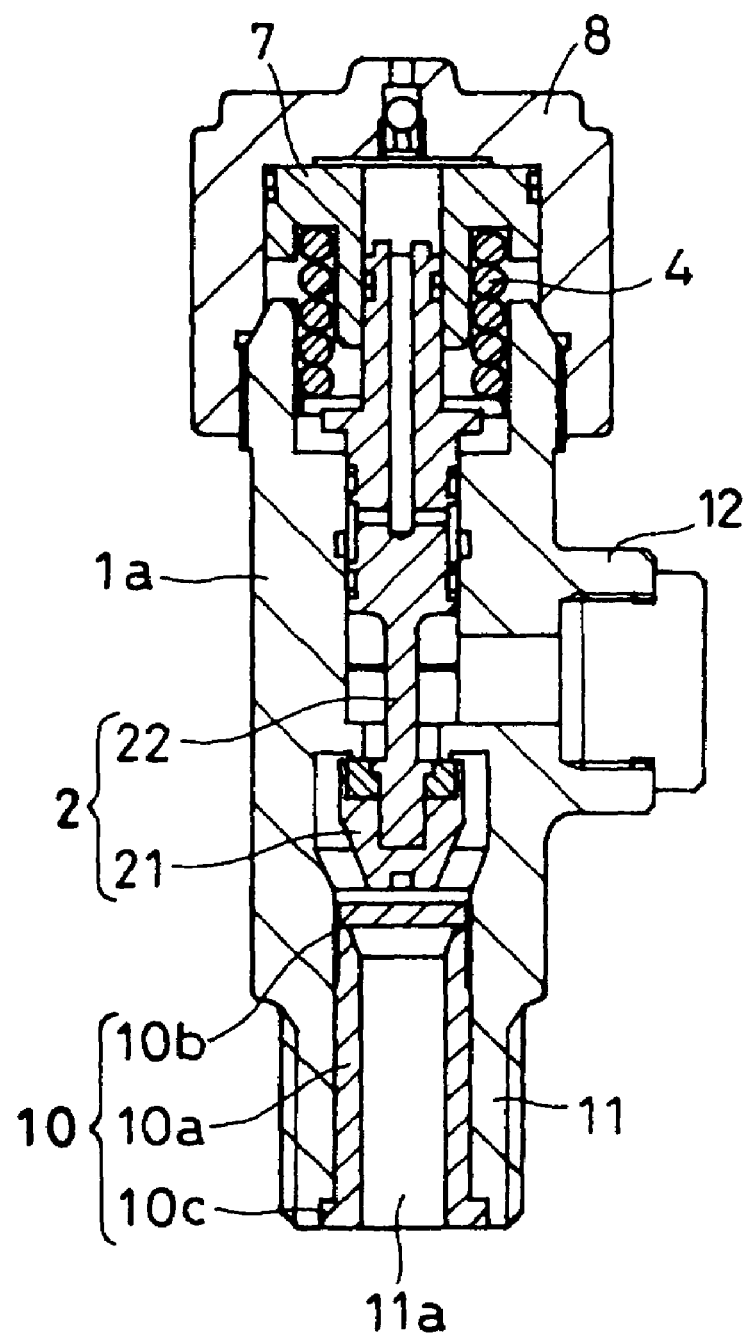
FIG. 9 is a cross-sectional view showing an entire configuration of a rapidly opening pressure regulating valve of further another embodiment of the invention.

FIG. 9 is a cross-sectional view showing an entire configuration of a rapidly opening pressure regulating valve of further another embodiment of the invention. The rapidly opening pressure regulating valve of this example includes a main body 1a, a valve member 2, a spring receptacle 8, a spring 4, which is a bias member, a moving spring receptacle 7, which is a moving receiving portion, and a bush 10 for reinforcement, which is insert portion reinforcing means. The valve member 2 composed of a valve component 21 and a main valve member 22. The rapidly opening pressure regulating valve of this example is different from the rapidly opening pressure regulating valve of the example shown in FIGS. 3, 4 and 8 in the shapes of the inlet nozzle portion 11 and the fact that the bush 10 for reinforcement is provided. The same portions as in the rapidly opening pressure regulating valve shown in FIGS. 3, 4 and 8 bear the same reference numerals and are not described in detail. The relationship of the pressure applied to the valve member 2 as shown in FIG. 7 is the same as that in the rapidly opening pressure regulating valve shown in FIGS. 3, 4 and 8.

The structure of the bush 10 for reinforcement includes a bush main body 10a, which is a main body of reinforcing means provided across between both sides of a boundary between the housed portion that is housed in a cylinder and the exposed portion that is exposed outside the cylinder in the axis direction, a thread mechanism portion 10b that is provided on one side in the axis direction from the boundary for supplying a driving force toward the one side in the axis direction to the bush main body 10a, and a thread-advance preventing portion 10c that is provided on the other side in the axis direction from the boundary for preventing the bush main body 10a from advancing while being threaded to the one side in the axis direction. In this example, "one side in the axis direction" refers to the side of the exposed portion that is exposed outside a cylinder, that is, the side of the rapidly opening pressure regulating valve, and "the other side in the axis direction" refers to the side of the housed portion that is housed in the cylinder, that is, the side of the cylinder.

More specifically, the bush main body 10a is formed in a cylindrical shape. The thread mechanism portion 10b has an inner threaded portion that is formed integrally with the inner circumferential portion of the inlet nozzle portion 11, and an outer threaded portion that is formed integrally with the outer circumferential portion of the bush main body 10a and that is thread-engaged with the inner threaded portion. The thread-advance preventing portion 10c is formed integrally with the bush main body 10a and projects outward in the radial direction to be engaged with the inlet nozzle portion 11.

In order to mount the bush 10 for reinforcement, the bush 10 for reinforcement is inserted from the inlet 11a in such a direction that the thread mechanism portion 10b is first inserted, and is thread-advanced while being rotated about the axis. In this case, the bush main body 10a tries to thread-advance, but the bush main body 10a is prevented from thread-advancing by the thread-advance preventing portion 10c. At this point, when further rotation is provided, a force caused by the thread-advance preventing portion 10c pressing the inlet nozzle portion 11 in the thread-advancing direction and a force caused by the thread mechanism portion 10b pulling the inlet nozzle portion 11 to the cylinder side compress the inlet nozzle portion 11. Thus, the mechanical strength of the inlet nozzle portion 11 can be increased.

The bush 10 for reinforcement, which is insert portion reinforcing means, may be applied to a rapidly opening pressure regulating valve having a conventional structure.

Figure 10:
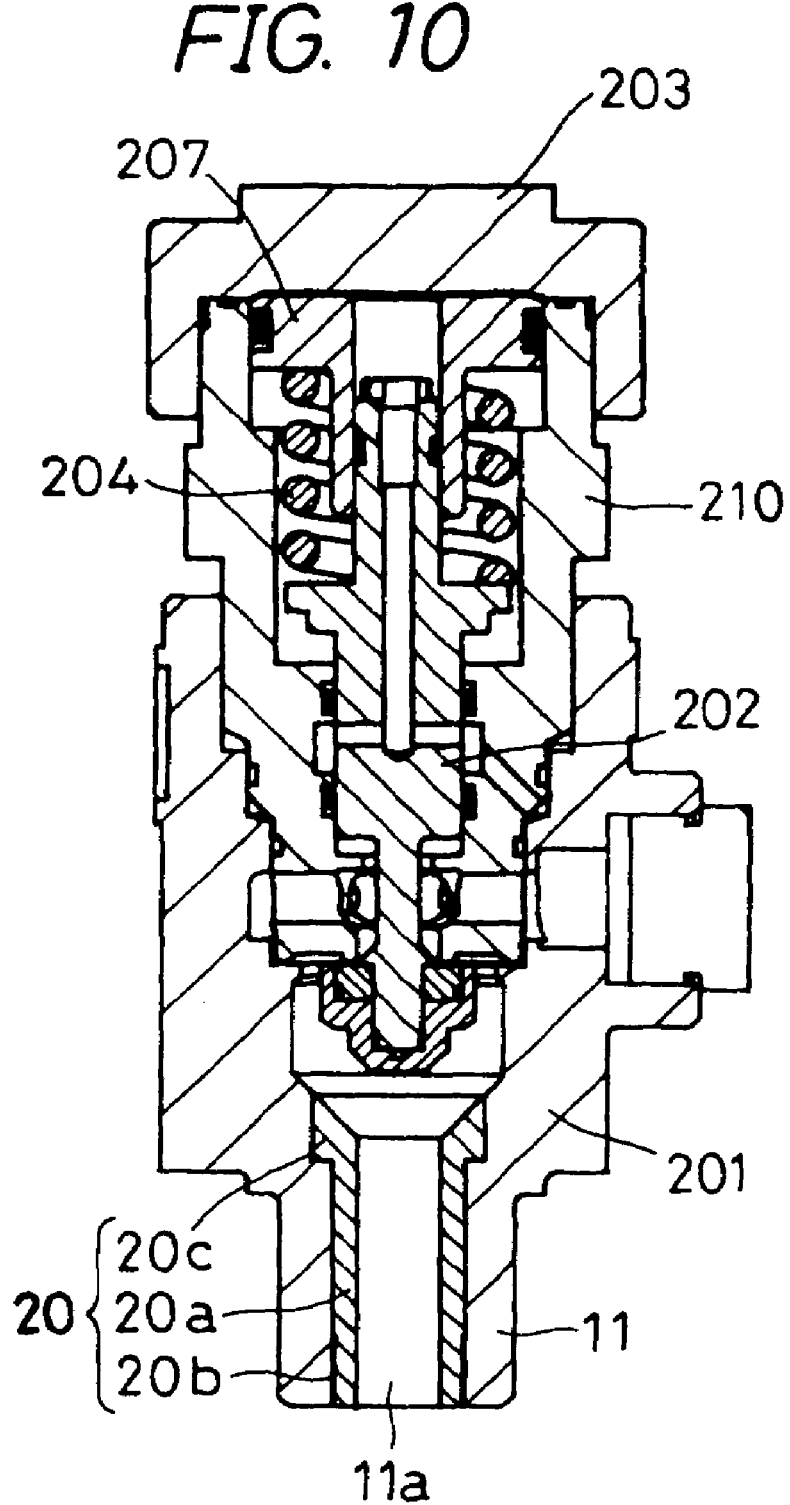
FIG. 10 is a cross-sectional view showing an entire configuration of a rapidly opening pressure regulating valve of yet another embodiment of the invention.

FIG. 10 is a cross-sectional view showing an entire configuration of a rapidly opening pressure regulating valve of yet another embodiment of the invention. The rapidly opening pressure regulating valve of this example includes a main body 201, a valve member 202, a spring receptacle 203, a spring 204, a moving spring receptacle 207, a middle body 210, and a bush 20 for reinforcement The rapidly opening pressure regulating valve of this example is different from the rapidly opening pressure regulating valve of the example shown in FIG. 14 in that the bush 20 for reinforcement is provided in the inlet nozzle portion 11. The same portions as in the rapidly opening pressure regulating valve shown in FIG. 14 bear the same reference numerals and are not described in detail. The relationship of the pressure applied to the valve member 2 as shown in FIG. 7 is the same as that in the rapidly opening pressure regulating valve shown in FIGS. 3, 4, 8 and 9.

In this example, the structure of the bush 20 for reinforcement includes a bush main body 20a, a thread mechanism portion 20b, and a thread-advance preventing portion 20c, and is similar to the structure of the bush 10 for reinforcement shown in FIG. 9, but is different in the positions of the thread mechanism portion 20b and the thread-advance preventing portion 20c. Since in the rapidly opening pressure regulating valve of this example, the main body 201 and the middle body 210 are discrete members, the bush 20 for reinforcement is inserted from, not the inlet 11a, but the side of the middle body 210 and is thread-advanced while being rotated about the axis. Therefore, in this example, "one side in the axis direction" refers to the side of the housed portion that is housed in a cylinder, that is, the cylinder side, and "the other side in the axis direction" refers to the side of the exposed portion that is exposed outside the cylinder, that is, the rapidly opening pressure regulating valve side.

Even if the bush 20 for reinforcement is inserted in a different direction, the function and the effect are the same as in the bush 10 for reinforcement. A force caused by the thread-advance preventing portion 20c pressing the inlet nozzle portion 11 in the thread-advancing direction and a force caused by the thread mechanism portion 20b pulling the inlet nozzle portion 11 to the cylinder side compress the inlet nozzle portion 11. Thus, the mechanical strength of the inlet nozzle portion 11 can be increased.

Preferably, the length of the thread mechanism portions 10b, 20b of the bushes 10, 20 for reinforcement in the axis direction is such an extent that can apply a force that can provide a surface pressure of 3 to 5 kgf/mm$^2$ to the threaded surfaces of the thread mechanism portions 10b, 20b and the inlet nozzle portion 11 by thread-engaging. However, the length does not extend beyond the vicinity of the boundary where a shearing force may occur. The length in the axis direction of the thread-advance preventing portions 10c, 20c and the length of the projected portion in the radial direction that is projected outward in the radial direction are preferably such a length that can resist sufficiently the shearing force that occurs in the thread-advance preventing portions 10c, 20c when a force providing a surface pressure of 3 to 5 kgf/mm$^2$ to the threaded surfaces of the thread mechanism portions 10b, 20b and the inlet nozzle portion 11 by thread-engaging is applied.

FIG. 11 is a diagram showing a system outline of a nitrogen fire extinguishing apparatus, which is one example of an apparatus to which the above-described rapidly opening pressure regulating valve is applied. The nitrogen fire extinguishing apparatus includes a nitrogen cylinder 100 that is filled with nitrogen whose pressure is increased to about 150 kgf/cm$^2$G at 40° C., a rapidly opening pressure regulating valve 101 that is mounted therein, a $CO_2$ cylinder 102 for starting that has a pressure of about 110 kgf/cm$^2$G at a temperature of 40° C., a starter 103 that is mounted therein, has the same structure as the valve-operating mechanism of FIG. 6B, and is operated by a solenoid or the like instead of high pressure inert gas, a starting gas line 104, a fire extinguishing line 105, a safety apparatus 106, a base valve 107, a selection valve 108 for selecting a fire extinguishment area, an individual fire extinguishing line 109, and a fire extinguishing area 110. The rapidly opening pressure regulating valve is designed so as to have the following relationship based on formula (2), when it is assumed that the area $(\pi/4)(d_4^2 - d_1^2)$ of the opening pressure-receiving surface 25 is equal to the area $(\pi/4) d_3^2$ of the valve component 21 that comes in contact with the valve seat 13, and for example, $P_2=110$ kgf/cm$^2$G is satisfied:

$$(\pi/4)[110(d_5^2-d_3^2)]=F \quad (3)$$

Herein, the unit of $d_5$ and $d_3$ is cm, and the unit of F is kgf.

The rapidly opening pressure regulating valve having the above-described structure operates in the following manner. An inlet pressure $P_1$ of about 150 kgf/cm$^2$G is applied to the rapidly opening pressure regulating valve from the nitrogen cylinder 100, and the sealing plate 52 is not broken. Therefore, in formula (1), assuming $d_4=0$, a large valve closing force of $P_1(d_3^2+d_1^2)\pi/4$ is exerted so that the vale is firmly closed. In this state, for example, when a fire take places in any fire extinguishment area 110, the starter 103 is operated, so that an operation gas with about a pressure of 110 kgf/cm$^2$G is introduced to the valve-operating mechanism 6 of the rapidly opening pressure regulating valve 101 from the CO$_2$ cylinder 102 through the starting gas line 104.

In the valve-operating mechanism 6, the starting gas is introduced in a portion above the operation ring 64 through communication holes that are opened in the outer tube 61, the inner tube 62, and the cover 63, and a gas pressure is generated between this member and the rod 67, the operation ring 64 and accordingly the needle member 65 and the point 65a are pressed down, and penetrate and open the sealing plate 52. Then, nitrogen is immediately introduced from the inlet 11a to the upper end portion through the lateral communication hole 14, the air supply port 55, the connection communication hole 16, and the communication hole 23, and the pressure $P_1$ is applied to the opening pressure-receiving surface 25 of the valve member 2 and the pressure-receiving surface 7a of the moving spring receptacle 7. On the other hand, $d_3$ and $d_4$ are both effective, the $P_1$ portion of formula (1) becomes 0, and the outlet pressure $P_2$ is an atmospheric pressure, there is substantially no valve opening/closing force by pressure. Then, the valve member 2 is pressed down by the spring force F in a reliable manner, so that the valve is opened immediately. Thus, nitrogen rapidly flows to the fire extinguishing line 105 and the subsequent elements to fill the fire extinguishment area 110 and thus provides a fire extinguishing effect.

On the other hand, when the valve is opened, and, for example, the base valve 107 or the selection valve 108 are closed, then the pressure in the fire extinguishing line 105 is increased, and as a result, the pressure in the outlet 12a of the rapidly opening pressure regulating valve 101 is increased. However, when this pressure has reached 110 kgf/cm$^2$, the force by the outlet pressure and the valve opening/closing force is balanced because the sizes and the spring force are determined as shown in formula (2). When the pressure exceeds 110 kgf/cm$^2$, the valve closing force by pressure becomes larger than the spring force, so that the valve is closed. As a result, the excessive increase of the pressure on the outlet side from 110 kgf/cm$^2$G or more can be prevented.

As described above, the rapidly opening pressure regulating valve of this example can supply fluid by opening the valve reliably and immediately when a fire should be extinguished, and can restrict the pressure on the outlet side to a predetermined pressure, for example, 110 kgf/cm$^2$G or less. Therefore, it is not necessary to increase the pressure resistance of the entire fire extinguishing system such as lines or valves to 110 kgf/cm$^2$G or more, which is required in the case of conventional CO$^2$ fire extinguishing systems. As a result, it is possible to use a nitrogen fire extinguishing apparatus having a fire extinguishing capacity as high as, for example, 150 kgf/cm$^2$G without causing increase of the cost of facility and the like.

The invention can be used for a nitrogen fire extinguishing apparatus having a pressure of, for example, about 300 kgf/cm$^2$G. The rapidly opening pressure regulating valve of the invention can be used widely for, not only nitrogen fire extinguishing apparatuses, but also fire extinguishing apparatuses using other inert gas, high pressure gas cylinders and the like.

Furthermore, when the pressure of the nitrogen cylinder 100 is reduced, it is possible to prevent nitrogen from flowing into the outlet line. Even if the valve is opened and nitrogen enters the outlet line, since unnecessary blowing of fire extinguishing gas to a fire extinguishment area is prevented by the base valve 107 or the selection valve 108 in the fire extinguishing system, there is no hazardousness. Moreover, according to this example, when filling the nitrogen cylinder 100 with nitrogen at the shipment from a plant, when the pressure in the cylinder is increased even slightly, the valve is closed immediately by the resistance of the valve, so that nitrogen can be filled in a state where the outlet nozzle portion 12 is opened or is lightly covered by a cap, and thus the handling properties of the valve are improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention, a rapidly opening pressure regulating valve is constituted by a combination of a main body, a valve member, a receiving member, a biasing member, pressure-sealing means and sealed pressure-releasing means; a channel for communicating between an inlet of the main body and the other end side is provided in the valve member and the main body; the channel is blocked by a pressure-sealing member of the pressure-sealing means; a pressure-receiving area for receiving a fluid pressure of the valve component portion that is seated in the valve seat, a pressure-receiving area of the closing pressure-receiving surface of the valve member, a pressure-receiving area of the opening pressure-receiving surface positioned on the other end side, and an opening biasing force of the biasing member are determined so as to have a relationship that allows a pressure in the outlet of the main body to be a predetermined pressure or less, in which a valve closing force that closes the valve component portion when the channel is communicated between the one end side and the other end side, the opening pressure-receiving surface receives a pressure in the opening direction and a pressure in the outlet exceeds a predetermined pressure becomes larger than the biasing force so that the valve component portion is closed. The valve member is opened and closed, depending on the conditions in the following manner.

First, when the pressure-sealing means is not operated and the channel is blocked by the pressure-sealing member, the opening pressure-receiving surface is not operated, and therefore the force of the inlet pressure acting on the valve member in the closing direction becomes larger than the biasing force, so that the valve member is maintained closed.

Next, when the pressure-sealing means is operated, the pressure-sealing member blocking the channel is opened and the inlet pressure is applied to the opening pressure-receiving surface, which releases or reduces the closing pressure in the inlet portion of the valve member and makes the biasing force of the biasing member effective to open the valve member in a reliable manner.

Furthermore, when the outlet pressure is increased in this state, the pressure to the closing pressure-receiving surface becomes larger than the biasing force, so that the valve is closed to restrict the outlet pressure so as not to increase beyond a predetermined pressure. As a result, even if the fluid inlet pressure is high, the outlet pressure is limited to a predetermined pressure or less to reduce the pressure resistance of tubes, valves or the like to that pressure. Then, it is possible to use a nitrogen fire extinguishing apparatus having a high pressure of about 150 kgf/cm$^2$G or more and a large fire extinguishment capacity, while maintaining, for example, an outlet pressure of 110 kgf/cm$^2$G, which corresponds to the design pressure of the conventional fire extinguishing apparatus, that is, without increasing the cost of tubes and the like.

Furthermore, a moving receiving portion provided with a pressure-receiving surface receiving the same pressure as the opening pressure-receiving surface is provided between the receiving member and the biasing member and is guided movably in the opening/closing direction, and when the sealed pressure is released, the pressure-receiving surface receives the pressure so that the moving receiving portion is moved to a predetermined position in the opening direction. Moreover, a positioning portion is provided so as to stop the moving receiving portion at this position. Therefore, the biasing force can be generated in the biasing member at this predetermined position at the time of opening. As a result, the outlet pressure can be controlled to a predetermined pressure or less.

On the other hand, when the sealed pressure is not released, no pressure is applied to the pressure-receiving surface, and therefore a force that moves the moving receiving portion to a predetermined position is not generated, and the moving receiving portion moves freely in a direction opposite to the predetermined position as a result of having received a reaction of the biasing member. Consequently, the biasing force of the biasing member is not generated, and the valve member is not biased to the opening direction by the biasing member. Consequently, even if the fluid pressure on the inlet side is reduced, unnecessary opening of the valve due to the biasing force of the biasing member is prevented. Furthermore, when filling gas in a fire extinguishing gas container or the like on which the rapidly opening pressure regulating valve is mounted, gas can be filled without completely closing the outlet side, so that the handling properties of the apparatus can be improved.

In order to realize the rapidly opening pressure regulating valve having the above-described structure, a middle body provided with a valve seat was necessary as a conventional rapidly opening pressure regulating valve as shown in FIGS. 12 to 14. However, in the invention, the valve component is mounted removably on one end side of the main valve member through the inlet of the main body, so that the valve seat is provided in the main body, and the main valve member can be inserted from the upper end side of the main body and the valve component can be inserted from the inlet of the main body, and these elements can be mounted with the valve seat sandwiched thereby. Thus, the middle body is not necessary so that the number of the components can be reduced, thereby reducing the size of the rapidly opening pressure regulating valve.

According to the present invention, as the sealed pressure-releasing means, a needle portion provided so as to be opposed to the pressure-sealing member is provided in a piston-like member that is operated by a fluid pressure, and the piston-like member is operated by an operating portion. Therefore, the pressure-sealing member can be operated remotely by a fluid pressure and even if fluid pressure lines are out of order or the like, the pressure-sealing member can be opened and closed by a manual operation on the machine side, so that safety of the apparatus can be improved.

According to the present invention, the valve component includes a contact portion that comes in contact with the valve seat, and a reinforcing portion that suppresses deformation of the contact portion.

At the time of contact with the valve seat, the contact portion is deformed in the lateral direction, and in order to suppress the deformation, it is necessary to cover the outer circumference of the contact portion with a reinforcing portion having a predetermined thickness. Herein, the predetermined thickness is determined by the tensile strength, which is characteristic value of the material of the reinforcing portion. As the tensile strength is larger, the thickness of the reinforcing portion can be thinner, and the valve component can be smaller.

According to the invention, the area of a region of the valve component that is opposed to the valve seat is the same as the area of the opening pressure-receiving surface. Therefore, the opening/closing force of the valve member is determined by the outlet pressure, the size of the valve seat, the size of the closing pressure-receiving surface, and the biasing force of the biasing member. Therefore, it is easy to design the valve. Since the outlet pressure can be limited regardless of the inlet pressure, the fluid is prevented from flowing back to the inlet side when the outlet pressure is in increase. Furthermore, since the number of portions involved in pressure adjustment is decreased, the operation stability of the valve is increased, and the outlet pressure can be limited reliably, so that the reliability of the valve can be improved.

According to the invention, the pressure-receiving area of the closing pressure-receiving surface is reduced while the pressure-receiving area for receiving a fluid pressure of the valve component seated in the valve seat, and the pressure-receiving area of the opening pressure-receiving surface are predetermined and the above-described relationship is maintained. The valve closing force is reduced by reducing the pressure-receiving area of the closing pressure-receiving surface so that the relationship is changed, but can be realized by reducing the spring force. By reducing the pressure-receiving area of the closing pressure-receiving surface, the diameter of the rapidly opening pressure regulating valve is reduced, and can be more compact. Furthermore, the displacement amount of the valve member can be increased by reducing the spring force, so that the flow rate characteristics can be improved.

According to the invention, the receiving member is constituted such that its inner circumferential surface can guide movement of the moving receiving portion in the opening/closing direction. Thus, the length of the main body in the opening/closing direction can be reduced, and the weight of the main body can be reduced, and processing can be facilitated.

According to the invention, the receiving member and the main body are constituted so as to be capable of being thread-engaged with each other, and have contact portions other than engaged portions, and the contact portions are formed to be tapered. This makes it easy to align the axes when the receiving portion and the main body are engaged with each other.

According to the invention, a rapidly opening pressure regulating valve comprises a valve member configured so as to be displaceable along an axis, and a main body formed integrally with a cylinder insert portion that is inserted in a high pressure gas cylinder and in which an inlet of gas is formed, wherein insert portion reinforcing means that increases a mechanical strength of the cylinder insert portion is provided. In particular, the insert portion reinforcing means reinforces a portion including a vicinity of a boundary between a housed portion that is housed in a cylinder and an exposed portion that is exposed outside the cylinder.

When the mechanical strength of the cylinder insert portion is increased, the rapidly opening pressure regulating valve, in particular, the cylinder insert portion when inserted in the cylinder is prevented from being deformed.

According to the invention, the structure of the insert portion reinforcing means comprises a reinforcing means main body portion provided across between both sides in the axis direction of the boundary, a thread mechanism portion provided on one side in the axis direction of the boundary for supplying a driving force to the reinforcing means main body portion toward the one side in the axis direction, and a thread-advance preventing portion provided on the other side in the axis direction of the boundary for preventing the reinforcing means main body portion from thread-advancing while being threaded to the one side in the axis direction. More specifically, the reinforcing means main body portion is formed in a cylindrical shape, the thread-advance preventing portion is formed integrally with the reinforcing means main body portion and projects outward in a radial direction to be engaged with a cylinder insert portion, and the thread mechanism portion has an inner threaded portion that is formed integrally with the inner circumferential portion of the cylinder insert portion, and an outer threaded portion that is formed integrally with the outer circumferential portion of the reinforcing means main body portion and that is thread-engaged with the inner threaded portion.

According to the invention, by thread-engaging the insert portion reinforcing means with the cylinder insert portion, a force caused by pressing by the thread-advance preventing portion and a force caused by pulling by the thread mechanism portion compress the cylinder insert portion. Thus, the mechanical strength of the cylinder insert portion can be increased. Furthermore, a material having a higher strength than that of the cylinder insert portion can be used for the insert portion reinforcing means to increase the strength.

According to the invention, a fire extinguishing apparatus, a high pressure gas cylinder apparatus, and an apparatus for rapidly supplying a fluid using the above-described rapidly opening pressure regulating valve can be realized, so that fluid such as inert gas for fire extinguishment can be supplied rapidly, and the pressure of the fluid can be limited to a predetermined pressure or less.

The invention claimed is:

1. A rapidly opening pressure regulating valve comprising:
   (a) a main body provided with a valve seat intervening in a fluid channel communicating with an inlet and an outlet of the fluid and a single fluid guiding port to guide fluid from the center of the main body to the valve outlet;
   (b) a valve member being composed of:
      (b1) a main valve member having one end side facing the inlet and the other end side on the opposite side of the one end side, and having a closing pressure-receiving surface that is in communication with the outlet, for receiving a pressure in a closing direction, and an opening pressure-receiving surface formed on the other end side, for receiving a pressure in an opening direction, which valve member is guided movably in an opening/closing direction by the main body, and
      (b2) a valve component that is mounted removably on the one end side of the main valve member through the inlet and opened and closed by being brought into contact with and being detached from the valve seat;
   (c) a portion defining a channel for communicating the inlet with the other end side;
   (d) a biasing member for biasing the valve member in the opening direction;
   (e) a receiving member for closing a space in the main body in communicating with the channel;
   (f) a moving receiving portion that is interposed between the receiving member and the biasing member, the moving receiving portion being guided movably in the opening/closing direction in the main body, provided with a pressure-receiving surface for receiving a same pressure as the opening pressure-receiving surface, and generating a biasing force in the biasing member when moved to a predetermined position in the opening direction;
   (g) a positioning portion provided in the main body so as to stop the moving receiving portion at the predetermined position;
   (h) pressure-sealing means including a sealing plate that is provided so as to close the channel under a condition that the sealing plate is in communication with the channel; and
   (i) sealed pressure-releasing means provided in the main body, the sealed pressure-releasing means being constituted so as to supply a pressure in the channel to the opening pressure-receiving surface by breaking the sealing plate when operated,
   (j) wherein a pressure-receiving area for receiving a fluid pressure of the valve component that is seated in the valve seat, a pressure-receiving area of the closing pressure-receiving surface, a pressure-receiving area of the opening pressure-receiving surface, and a biasing force of the biasing member are determined so as to have a relationship in which the channel is communicated and the opening pressure-receiving surface receives a pressure in the opening direction, whereby the valve component portion is opened and a valve closing force that closes the valve component portion when a pressure in the outlet exceeds a predetermined pressure becomes larger than the biasing force, whereby the valve component portion is closed,
   wherein the receiving member is constituted such that in an inner circumferential surface of the receiving member, movement of the moving receiving portion is guidable in at least one of the opening and closing direction,
   wherein an outer circumferential surface of an upper end of the main body and the inner circumferential surface of the receiving member are threaded so as to correspond to each other, and the receiving member is constituted so as to be thread-engageable with the upper end of the main body, and
   wherein the receiving member and the main body have contact portions other than engaged portions, which contact portions are formed to be tapered at a position above the engaged portions.

2. The rapidly opening pressure regulating valve of claim 1, wherein the valve component comprises a contact portion that comes in contact with the valve seat; and
   a reinforcing portion for suppressing deformation of the contact portion, and the reinforcing portion is made of a material having a tensile strength of 200 N/mm$^2$ or more.

3. The rapidly opening pressure regulating valve of claim 1, wherein an area of a region of the valve component that is opposed to the valve seat is the same as an area of the opening pressure-receiving surface.

4. The rapidly opening pressure regulating valve of claim 1, wherein when the pressure-receiving area of the closing pressure-receiving surface is reduced, the pressure-receiving area for receiving a fluid pressure of the valve component seated in the valve seat and the pressure-receiving area of the opening pressure-receiving surface are constant, and the relationship is maintained.

5. A fire extinguishing apparatus comprising:
an inert gas cylinder for storing inert gas for fire extinguishment;
the rapidly opening pressure regulating valve of claim 1 in which the inlet of the main body is mounted on the inert gas cylinder,
wherein the fire extinguishing apparatus comprises a line for guiding the inert gas from an outlet of the rapidly opening pressure regulating valve to a fire extinguishment area.

6. A high pressure gas cylinder apparatus comprising:
a high pressure gas cylinder; and
the rapidly opening pressure regulating valve of claim 1 in which the inlet of the main body thereof is mounted on the high pressure gas cylinder.

7. An apparatus for rapidly supplying a fluid comprising:
a fluid source for supplying a fluid; and
the rapidly opening pressure regulating valve of claim 1 in which the inlet of the main body thereof is provided in the fluid source.

8. A rapidly opening pressure regulating valve comprising:
(a) a main body provided with a valve seat intervening in a fluid channel communicating with an inlet and an outlet of the fluid and a single fluid guiding port to guide fluid from the center of the main body to the valve outlet;
(b) a valve member being composed of:
  (b1) a main valve member having one end side facing the inlet and the other end side on the opposite side of the one end side, and having a closing pressure-receiving surface that is in communication with the outlet, for receiving a pressure in a closing direction, and an opening pressure-receiving surface formed on the other end side, for receiving a pressure in an opening direction, which valve member is guided movably in an opening/closing direction by the main body, and
  (b2) a valve component that is mounted removably on the one end side of the main valve member through the inlet and opened and closed by being brought into contact with and being detached from the valve seat;
(c) a portion defining a channel for communicating the inlet with the other end side;
(d) a biasing member for biasing the valve member in the opening direction;
(e) a receiving member for closing a space in the main body in communicating with the channel;
(f) a moving receiving portion that is interposed between the receiving member and the biasing member, the moving receiving portion being guided movably in the opening/closing direction in the main body, provided with a pressure-receiving surface for receiving a same pressure as the opening pressure-receiving surface, and generating a biasing force in the biasing member when moved to a predetermined position in the opening direction;
(g) a positioning portion provided in the main body so as to stop the moving receiving portion at the predetermined position;
(h) pressure-sealing means including a pressure-sealing member that is provided so as to close the channel under a condition that the pressure-sealing member is in communication with the channel; and
(i) sealed pressure-releasing means provided in the main body, the sealed pressure-releasing means being constituted so as to supply a pressure in the channel to the opening pressure-receiving surface by keeping the pressure-sealing member open when operated,
(j) wherein a pressure-receiving area for receiving a fluid pressure of the valve component that is seated in the valve seat, a pressure-receiving area of the closing pressure-receiving surface, a pressure-receiving area of the opening pressure-receiving surface, and a biasing force of the biasing member are determined so as to have a relationship in which the channel is communicated and the opening pressure-receiving surface receives a pressure in the opening direction, whereby the valve component portion is opened and a valve closing force that closes the valve component portion when a pressure in the outlet exceeds a predetermined pressure becomes larger than the biasing force, whereby the valve component portion is closed,
wherein the receiving member is constituted such that in an inner circumferential surface of the receiving member, movement of the moving receiving portion is guidable in at least one of the opening and closing direction,
wherein an outer circumferential surface of an upper end of the main body and the inner circumferential surface of the receiving member are threaded so as to correspond to each other, and the receiving member is constituted so as to be thread-engageable with the upper end of the main body, and
wherein the receiving member and the main body have contact portions other than engaged portions, which contact portions are formed to be tapered at a position above the engaged portions.

9. The rapidly opening pressure regulating valve of claim 8, wherein the pressure-sealing member is a sealing plate, the sealed pressure-releasing means comprising:
a needle portion provided so as to be opposed to the sealing plate;
a piston-like member for biasing the needle portion such that the needle portion penetrates the sealing plate by receiving a fluid pressure; and
an operating portion formed so as to the bias the piston-like member.

10. The rapidly opening pressure regulating valve of claim 8, wherein the valve component comprises a contact portion that comes in contact with the valve seat; and
a reinforcing portion for suppressing deformation of the contact portion, and the reinforcing portion is made of a material having a tensile strength of $200 \text{ N/mm}^2$ or more.

11. The rapidly opening pressure regulating valve of claim 8, wherein an area of a region of the valve component that is opposed to the valve seat is the same as an area of the opening pressure-receiving surface.

12. The rapidly opening pressure regulating valve of claim 8, wherein when the pressure-receiving area of the closing pressure-receiving surface is reduced, the pressure-receiving area for receiving a fluid pressure of the valve component seated in the valve seat and the pressure-receiving area of the opening pressure-receiving surface are constant, and the relationship is maintained.

13. A fire extinguishing apparatus comprising:
an inert gas cylinder for storing inert gas for fire extinguishment;
the rapidly opening pressure regulating valve of claim 8 in which the inlet of the main body is mounted on the inert gas cylinder, wherein the fire extinguishing apparatus comprises a line for guiding the inert gas from an outlet of the rapidly opening pressure regulating valve to a fire extinguishment area.

14. A high pressure gas cylinder apparatus comprising:
a high pressure gas cylinder; and
the rapidly opening pressure regulating valve of claim 8 in which the inlet of the main body thereof is mounted on the high pressure gas cylinder.

15. An apparatus for rapidly supplying a fluid comprising:
a fluid source for supplying a fluid; and
the rapidly opening pressure regulating valve of claim 8 in which the inlet of the main body thereof is provided in the fluid source.

16. A rapidly opening pressure regulating valve comprising:
a valve member configured so as to be displaceable along an axis thereof; and
a main body formed integrally with a cylinder insert portion that is inserted in a high pressure gas cylinder and in which an inlet of gas is formed,
the rapidly opening pressure regulating valve comprising:
insert portion reinforcing means for increasing a mechanical strength of the cylinder insert portion,
wherein the cylinder insert portion includes a housed portion that is housed in a cylinder and an exposed portion that is exposed outside the cylinder
wherein the insert portion reinforcing means comprises:
  a main body portion provided between both sides in the axis direction of a boundary between the housed portion and the exposed portion;
  a thread mechanism portion provided on one side in the axis direction of the boundary, to supply a driving force to the main body portion toward the one side in the axis direction; and
  a thread-advance preventing portion provided on the other side in the axis direction of the boundary, to prevent the main body portion from advancing while being threaded to the one side in the axis direction, and
wherein the insert portion reinforcing means reinforces a portion including a vicinity of the boundary by making the cylinder insert portion into a compressed state, and
wherein the main body portion is formed in a cylindrical shape,
the thread-advance preventing portion is formed integrally with the main body portion and projects outward in a radial direction of the main body portion to be engaged with a cylinder insert portion, and
the thread mechanism portion has an inner threaded portion that is formed integrally with the inner circumferential portion of the cylinder insert portion, and an outer threaded portion that is formed integrally with the outer circumferential portion of the main body portion and that is thread-engaged with the inner threaded portion.

17. A fire extinguishing apparatus comprising:
an inert gas cylinder for storing inert gas for fire extinguishment;
the rapidly opening pressure regulating valve of claim 16 in which the inlet of the main body is mounted on the inert gas cylinder,
wherein the fire extinguishing apparatus comprises a line for guiding the inert gas from an outlet of the rapidly opening pressure regulating valve to a fire extinguishment area.

18. A high pressure gas cylinder apparatus comprising:
a high pressure gas cylinder; and
the rapidly opening pressure regulating valve of claim 16 in which the inlet of the main body thereof is mounted on the high pressure gas cylinder.

19. An apparatus for rapidly supplying a fluid comprising:
a fluid source for supplying a fluid; and
the rapidly opening pressure regulating valve of claim 16 in which the inlet of the main body thereof is provided in the fluid source.

* * * * *